US012790356B2

(12) United States Patent
Martin et al.

(10) Patent No.: US 12,790,356 B2
(45) Date of Patent: Nov. 10, 2026

(54) REACTIVE SECONDARY BORANES AND METHODS FOR SYNTHESIS THEREOF

(71) Applicant: BAYLOR UNIVERSITY, Waco, TX (US)

(72) Inventors: Caleb Martin, Waco, TX (US); Manjur Akram, Waco, TX (US)

(73) Assignee: BAYLOR UNIVERSITY, Waco, TX (US)

( * ) Notice: Subject to any disclaimer, the term of this patent is extended or adjusted under 35 U.S.C. 154(b) by 441 days.

(21) Appl. No.: 18/593,053

(22) Filed: Mar. 1, 2024

(65) Prior Publication Data

US 2024/0300982 A1 Sep. 12, 2024

Related U.S. Application Data

(60) Provisional application No. 63/449,662, filed on Mar. 3, 2023.

(51) Int. Cl.
*C07F 5/02* (2006.01)

(52) U.S. Cl.
CPC .................................... *C07F 5/027* (2013.01)

(58) Field of Classification Search
CPC ....................................................... C07F 5/027
See application file for complete search history.

(56) References Cited

U.S. PATENT DOCUMENTS

| | | | | |
|---|---|---|---|---|
| 2003/0023118 A1* | 1/2003 | Kanayama | ............. | B82Y 30/00 568/4 |
| 2022/0040210 A1* | 2/2022 | Coss | ..................... | C07F 9/6561 |

OTHER PUBLICATIONS

International Search Report and The Written Opinion of the International Search Authority—The European Patent Office—mailed Jun. 28, 2024, for PCT/US2024/018029, 14 pages.

Akram et al., "Tris(ortho-carboranyl)borane: An Isolable, Halogen-Free, Lewis Superacid", Angew. Chem. Int. Ed., Nov. 14, 2022, vol. 61, No. 46, 7 pages.

Krebs et al., —"Synthesis and Structure of an o-Carbonyl-Substituted Three-Coordinate Borane Radical Anion", Chemistry—A European Journal, Jun. 1, 2021, vol. 27, No. 31, pp. 8159-8167.

Brown et al., "Polymers and Ceramics based on Icosahedral Carboranes—Model Studies of the Formation and Hydrolytic Stability of Aryl Ether, Ketone, Amide and Borane Linkages between Carborane Units", J. Mater. Chem., 1992, 2(8), pp. 793-804.

Akram et al., "The Effect of Carborane Substituents on the Lewis Acidity of Boranes", Inorganic Chemistry, Aug. 10, 2023, vol. 62, No. 33, pp. 13495-13504.

Akram et al., "Bis(1-Methyl-ortho-Carboranyl)Borane", Angew. Chem. Int. Ed., Aug. 21, 2023, vol. 62, No. 34, 6 pages.

* cited by examiner

*Primary Examiner* — Pancham Bakshi
(74) *Attorney, Agent, or Firm* — Jackson Walker LLP

(57) ABSTRACT

A secondary borane featuring two ortho-carborane substituents [$HBoCb_2$, oCb=ortho-carborane] is useful as a powerful hydroboration reagent. The Lewis superacid, bis(1-methyl-ortho-carboranyl)borane, is rapidly accessed in two steps. It is a very effective hydroboration reagent capable of the hydroboration of alkenes, alkynes, cyclopropanes, and allenes. The large steric profile prevents double hydroboration of alkynes and promotes regioselectivity in allenes. The compound is a Lewis superacidic secondary borane and effective neutral hydroboration reagent.

7 Claims, 7 Drawing Sheets

Piers' Borane $HB(Fxyl)_2$ $HB(Fmes)_2$ $HB^{Me}oCb_2$

● = BH $HB^{Me}oCb_2$ $BrB^{Me}oCb_2$ $ClB^{Me}oCb_2$ $HB^{Me}oCb_2$ $OC{\cdot}BH^{Me}oCb_2$ $Et_3PO{\cdot}BH^{Me}oCb_2$ $EtOAc{\cdot}BH^{Me}oCb_2$

1a, $R^1$ = Ph, $R^2$ = H, 98%[a]
1b, $R^1$ = $C_6F_5$, $R^2$ = H, 94%[a]
1c, $R^1$ = *n*Bu, $R^2$ = H, 98%[a]
1d, $R^1$ = $SiMe_3$, $R^2$ = H, 96%[a]
1e, $R^1$ = $R^2$ = H, 98%[b]

1f, --[a,d]

1g, NR[e,f]

1f′, 90%[c]

1h, $R^1$ = Ph, $R^2$ = H, 96%[a,b]
1i, $R^1$ = *n*Bu, $R^2$ = H, 95%[a,b]
1j, $R^1$ = $SiMe_3$, $R^2$ = H, 97%[a,b]
1k, $R^1$ = Bpin, $R^2$ = H, 92%[a]
1l, $R^1$ = $R^2$ = Me, 89%[a,c]
1m, $R^1$ = Ph, $R^2$ = Me, 95%[a,c]
1n, $R^1$ = *t*Bu, $R^2$ = Ph, 89%[a]

1o, $R^1$ = Ph, $R^2$ = $SiEt_3$, 90%[a]
1p, $R^1$ = Ph, $R^2$ = Si*i*$Pr_3$, 86%[a]
1q, $R^1$ = Ph, $R^2$ = Sn*n*$Bu_3$, --[a,d]

1f′, $R^1$ = Ph, $R^2$ = H, 88%[a,b]
1v, $R^1$ = 4-Br-$C_6H_4$, $R^2$ = H, 90%[a,b]
1w, $R^1$ = 4-Ph-$C_6H_4$, $R^2$ = H, 94%[a,b]
1x, $R^1$ = 1-naphthyl, $R^2$ = H, 85%[a,b]
1y, $R^1$ = $PhCH_2$, $R^2$ = H, --%[b,c]
1z, $R^1$ = $R^2$ = Ph, NR[c,d]

REACTIVE SECONDARY BORANES AND METHODS FOR SYNTHESIS THEREOF

This application claims priority to U.S. Provisional Patent Application Ser. No. 63/449,662, entitled "Reactive Secondary Boranes and Methods for Synthesis Thereof," filed Mar. 3, 2023, the entire contents of which are incorporated by reference herein.

This invention was made with government support under grant 1753025 awarded by the National Science Foundation. The government has certain rights in the invention.

BACKGROUND

The present disclosure relates to methods for synthesizing secondary boranes and their use as reagents.

The hydroboration reaction pioneered by Brown has emerged as a powerful synthetic tool to selectively functionalize unsaturated bonds. While borane ($BH_3$) is an effective reagent for B—H addition reactions, the remaining two B—H bonds are susceptible to further reactivity. Accordingly, secondary boranes ($HBR_2$) are commonly the reagent of choice for hydroboration. The prototypical examples are diol chelated (i.e. pinacolborane and catecholborane) and alkyl substituted variants (9-BBN and $Sia_2BH$). The application of $HBR_2$ reagents has seen tremendous growth but there are limitations with the current systems. In some cases, catalysts can be employed to enable the reaction. In uncatalyzed reactions, the outcomes are highly influenced by the electronics and the sterics imparted by the two substituents on the borane. Accordingly, as the hydroboration reaction emerged in synthesis, research in advancing the reaction led to a quest for other reactive $HBR_2$ species.

A compound was developed by Piers and co-workers in the synthesis of the highly electrophilic bis(pentafluorophenyl)borane [$HB(C_6F_5)_2$], known as Piers' borane. This species is an extremely active hydroboration agent towards carbon-carbon multiple bonds with reactions proceeding at faster rates than other secondary boranes. It is evident that the fluorinated arenes serve as highly effective electron withdrawing groups to enhance electrophilicity and consequently reactivity at the boron atom. Parallel to the rich hydroboration chemistry, Piers' borane has been an effective reagent in a variety of organic transformations that includes the Lewis acid component in frustrated Lewis pairs, co-catalyst in olefin polymerization, and as a hydrogenation catalyst. The widespread applications of Piers' borane stimulated other groups to install trifluoromethyl groups as a method of fluorine loading on arene substituents to alter electronics and sterics [e.g. bis(2,4,6-tris-trifluoromethylphenyl)borane [$HB(Fmes)_2$] and bis(3,5-bis-trifluoromethylphenyl)borane [$HB(Fxyl)_2$]] that has been an effective method for fine-tuning the electrophilicity and hydroboration reactivity.

Recently, tris(ortho-carboranyl)borane ($BoCb_3$) was reported that is significantly more Lewis acidic than the halogen-loaded arene boranes, in fact falling into the classification of a Lewis superacid. In addition, the steric profile of the icosahedral carborane is significantly different than an arene. To date, the synthesis of an isolable, neutral, single-site Lewis superacidic secondary borane has yet to be realized.

SUMMARY

The present disclosure pertains to an electrophilic secondary borane, its synthesis and uses.

In particular, the present disclosure pertains to a secondary borane featuring two ortho-carborane substituents [$HBoCb_2$, oCb=ortho-carborane], its synthesis, and its use as a powerful hydroboration reagent. The ortho-carboranes could serve as an effective electron-withdrawing group on $HBR_2$ reagents and the bulk could alter selectivity or reactivity in hydroboration reactions. FIG. 1A shows selected examples of electrophilic secondary boranes ($HBR_2$) with fluorinated arenes. FIG. 1B shows a structural representation of targeted bis(ortho-carboranyl) borane, $HB^{Me}oCb_2$, as described herein. The Lewis superacid, bis(1-methyl-ortho-carboranyl)borane, is rapidly accessed in two steps. It is a very effective hydroboration reagent capable of the hydroboration of alkenes, alkynes, allenes and formal ring opening 1,3-hydroboration of cyclopropanes. The large steric profile prevents double hydroboration of alkynes and promotes regioselectivity allenes. To date, this is the first Lewis superacidic secondary borane and most effective neutral hydroboration reagent.

DETAILED DESCRIPTION OF PREFERRED EMBODIMENTS

The present disclosure relates to methods for synthesis and use of a highly electrophilic secondary borane, bis(1-methyl-ortho-carboranyl)borane.

Preferred embodiments of bis(1-methyl-ortho-carboranyl)borane ($HB^{Me}oCb_2$), have a structure shown below:

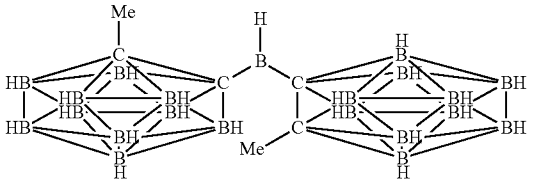

$HB^{Me}oCb_2$

The bis(ortho-carborane)borane ($HB^{Me}oCb_2$) disclosed herein is a Lewis superacid (LSA) and bears a very polar B—H bond. This secondary borane is an extraordinary hydroboration reagent. Notable reactions include the first hydroboration of a cyclopropane by a neutral borane, selective mono-hydroboration of alkynes, and regioselective hydroboration of allenes.

Figure 1A:
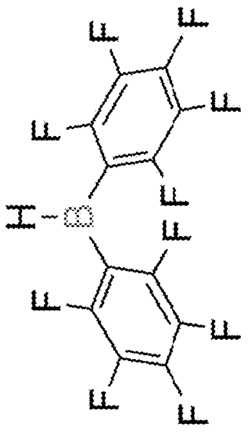
FIG. 1A PRIOR ART
FIG. 1A shows selected examples of electrophilic secondary boranes ($HBR_2$) with fluorinated arenes.
Figure 1A:
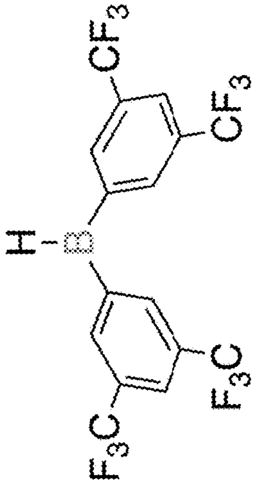
FIG. 1A PRIOR ART
Figure 1A:
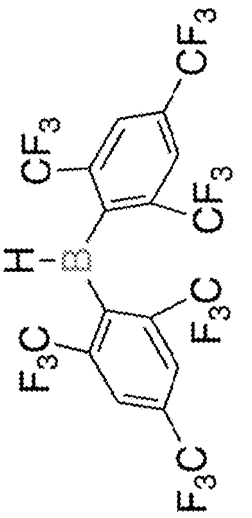
FIG. 1A PRIOR ART
Figure 1B:
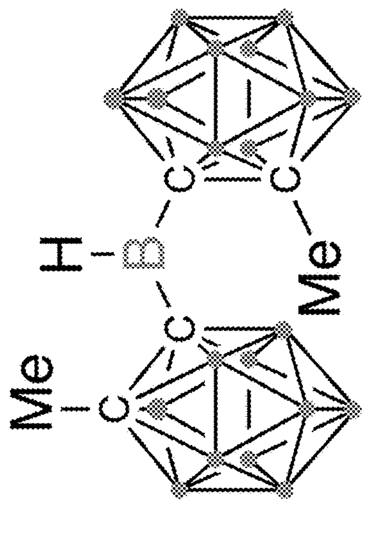
FIG. 1B shows structural representations of targeted bis (ortho-carboranyl) borane according to preferred embodiments disclosed herein.
Figure 1B:
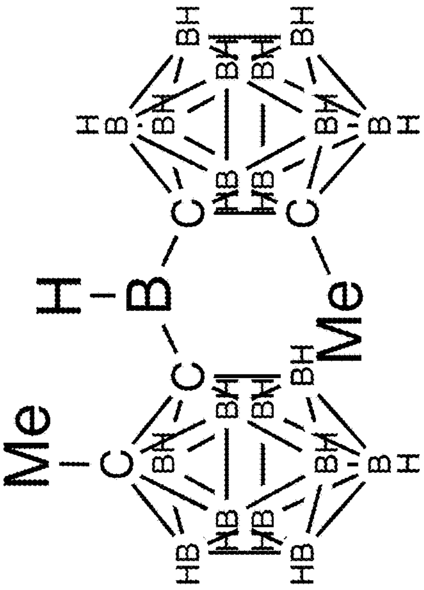
Figure 2:
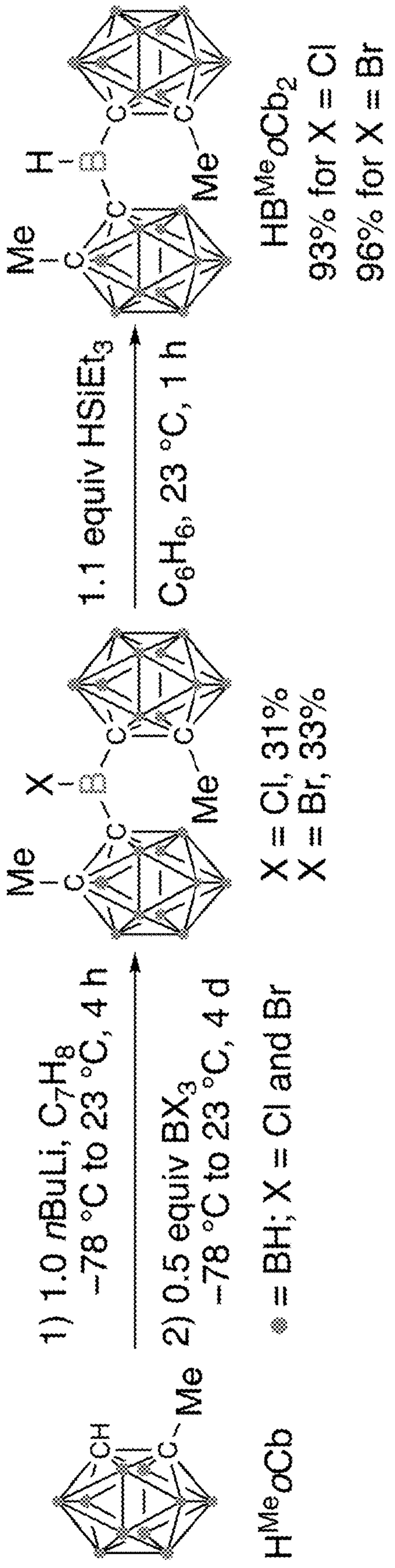
FIG. 2 shows Scheme 1, an exemplary method for the synthesis of $HB^{Me}oCb_2$, according to preferred embodiments disclosed herein.

Scheme 1 shown in FIG. 2 illustrates an exemplary method for the synthesis of $HB^{Me}oCb_2$, according to preferred embodiments disclosed herein. Lithiation of 1-methyl-ortho-carborane ($^{Me}oCbH$) with nBuLi followed by the reaction with half an equivalent of $BX_3$ (X═Cl, Br) generated haloborane $XB^{Me}oCb_2$ (isolated yield: 31% for X═Cl, 33% for X═Br).

Figure 3A:
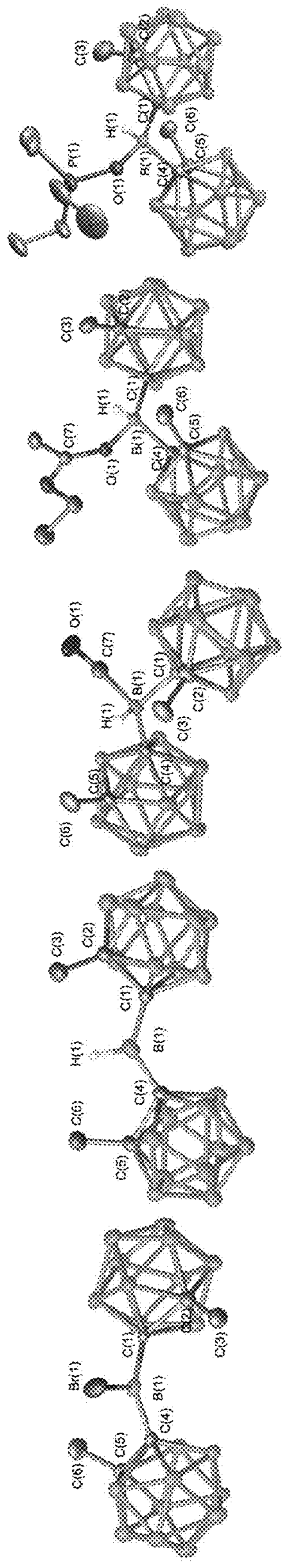
FIG. 3A shows solid state structures from single crystal X-ray diffraction of $BrB^{Me}oCb_2$, $HB^{Me}oCb_2$, $OC{\cdot}BH^{Me}oCb_2$, $EtOAc{\cdot}BH^{Me}oCb_2$, and $Et_3PO{\cdot}BH^{Me}oCb_2$.
Figure 3B:
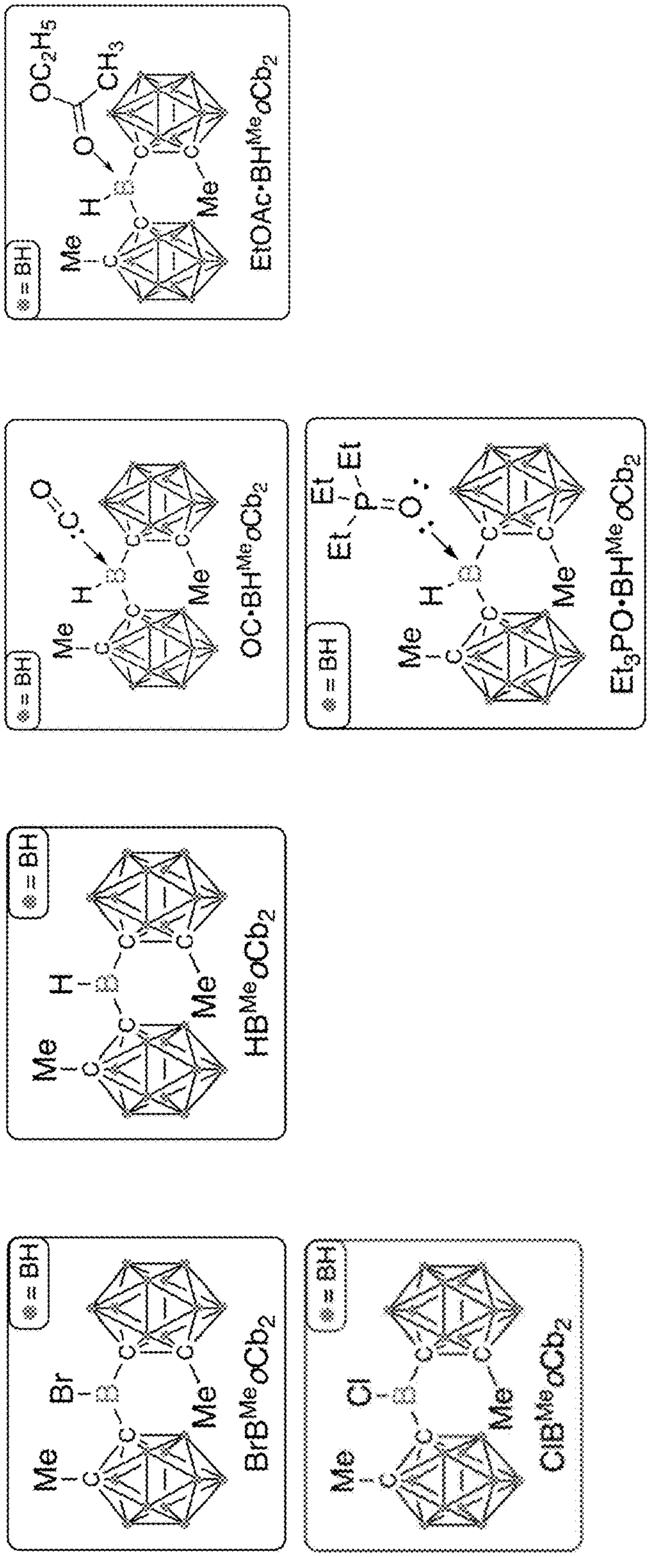
FIG. 3B shows chemical structures of $BrB^{Me}oCb_2$, $HB^{Me}oCb_2$, $OC{\cdot}BH^{Me}oCb_2$, $EtOAc{\cdot}BH^{Me}oCb_2$, and $Et_3PO{\cdot}BH^{Me}oCb_2$.

FIG. 3A shows solid state structures from single crystal X-ray diffraction of $BrB^{Me}oCb_2$, $HB^{Me}oCb_2$, $OC{\cdot}BH^{Me}oCb_2$, $EtOAc{\cdot}BH^{Me}oCb_2$, and $Et_3PO{\cdot}BH^{Me}oCb_2$. Ellipsoids are depicted at the 50% probability level, and hydrogen atoms (except for the H attached to the central boron atom) and non-coordinating solvent molecules are omitted for clarity. A single crystal X-ray diffraction study confirmed the identity of $BrB^{Me}oCb_2$ and the downfield broad $^{11}B$ resonance at 59.7 and 64.9 ppm are consistent with $XBR_2$ species. FIG. 3B shows chemical structures of $BrB^{Me}oCb_2$, $HB^{Me}oCb_2$, $OC{\cdot}BH^{Me}oCb_2$, $EtOAc{\cdot}BH^{Me}oCb_2$, and $Et_3PO{\cdot}BH^{Me}oCb_2$.

Treatment of $XB^{Me}oCb_2$ (X═Cl, Br) with triethylsilane ($HSiEt_3$) accessed $HB^{Me}oCb_2$ in excellent yields (X═Cl 93% yield and X═Br 96% yield), with the identity confirmed by the solid-state structure. Most known electrophilic secondary boranes are in a monomer-dimer equilibrium in solution, and monomers are extremely rare. Interestingly, $HB^{Me}oCb_2$ is monomeric in both the solid and solution state at room temperature (25° C.). The resonance in the $^{11}B$ NMR spectrum for the tricoordinate boron is observed at 70.9 ppm and in the $^{1}H$ NMR spectrum the diagnostic resonance for the central B—H peak is a broad singlet at 5.37 ppm, downfield in comparison to the monomeric electrophilic borane $HB(Fmes)_2$ (3.53 ppm). In the corresponding $^{1}H\{^{11}B\}$ NMR spectrum, the peak sharpens (full width at half maximum=19 Hz). Variable temperature $^{1}H$ and $^{1}H\{^{11}B\}$ NMR studies in toluene-$d_8$ only show the presence of the monomer in solution, in accord with the solid-state structure. Although the central boron atom is sterically encumbered, the B—C bond lengths to with respect to the central boron are 1.557(5) and 1.567(5) Å, in the typical range for ortho-carborane bound to boron. However, the bulk clearly impacts the C—B—C angle at boron as it is expanded to 128.0(3)°.

Theoretical calculations were carried out to predict the properties of $HB^{Me}oCb_2$. Fluoride and hydride affinities were calculated according to the method of Krossing, which are anchored to the fluoride and hydride affinity of $[Me_3Si]^+$ using BP86/SV(P). For $HB^{Me}oCb_2$, the fluoride affinity is calculated at 527 KJ/mol and the hydride affinity at 540 KJ/mol. For comparison, the fluoride affinity exceeds those of $SbF_5$ (494 KJ/mol), $B(C_6F_5)_3$ (452 KJ/mol), and $HB(C_6F_5)_2$ (429 KJ/mol) but is lower than $BoCb_3$ (622 KJ/mol). Clearly, substituting an oCb group for —H reduces the Lewis acidity but $HB^{Me}oCb_2$ still has a higher fluoride affinity than $SbF_5$, classifying it as a Lewis Superacid. The ammonia affinity for $HB^{Me}oCb_2$ is calculated to be 120 KJ/mol and for $HB(C_6F_5)_2$ it is slightly lower at 100 KJ/mol. The nature and energy level of the LUMO of $HB^{Me}oCb_2$ are compared to $HB(C_6F_5)_2$ using B3LYP/def2TZVP. The LUMO is entirely localized on the boron atom, unlike $HB(C_6F_5)_2$ that shows some delocalization onto the —$C_6F_5$ rings. Surprisingly, the LUMO energy of $HB^{Me}oCb_2$ is calculated to be 0.164 eV higher than the LUMO in $HB(C_6F_5)_2$. Natural population analysis revealed a significant difference between $HB^{Me}oCb_2$ and $HB(C_6F_5)_2$, with partial charges on the boron atom calculated to be +1.25 and +0.57, respectively. For the hydride, the respective partial charges are −0.21 and −0.03. Collectively, this indicates an extremely polar B—H bond.

Figure 4:
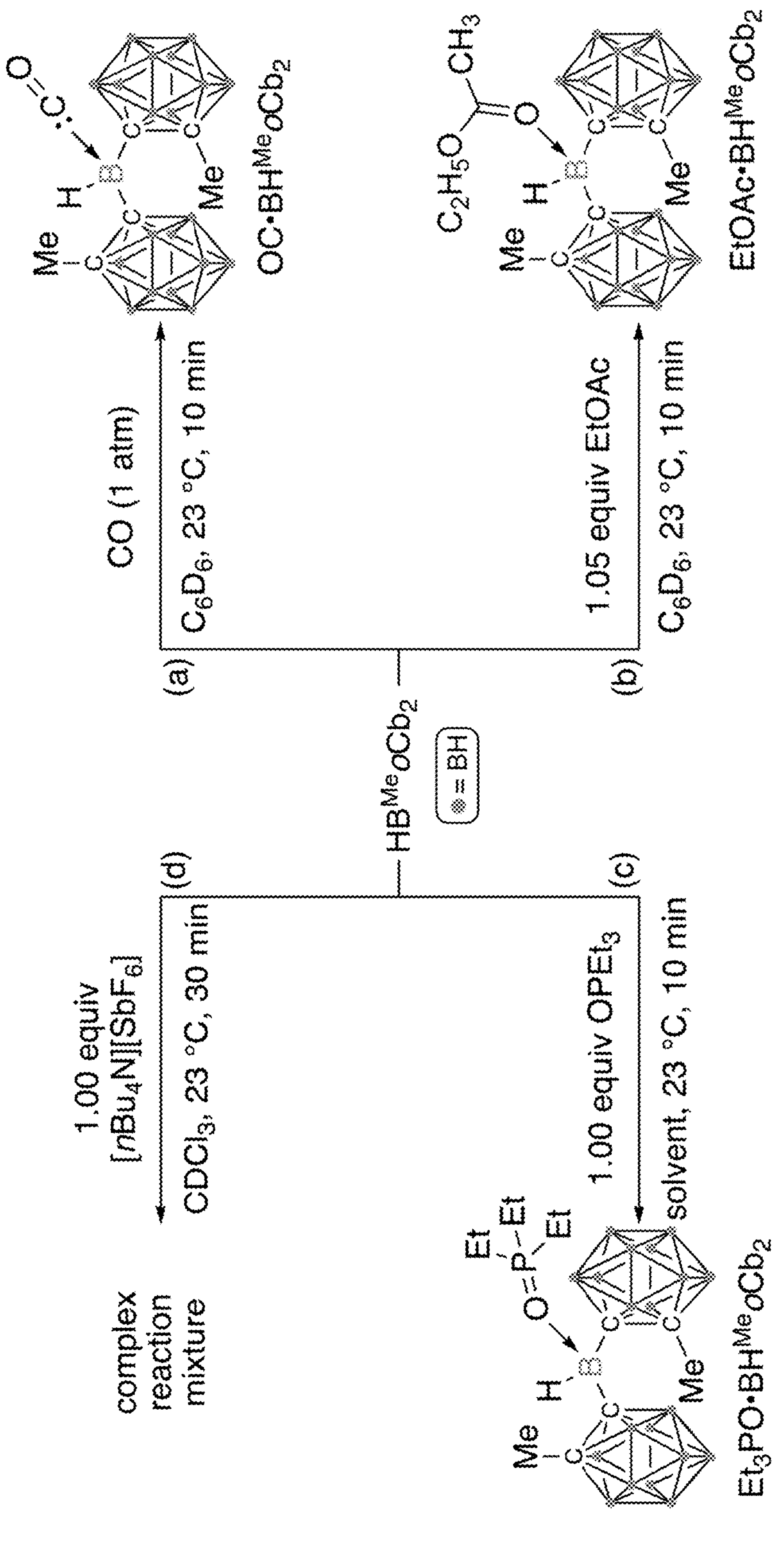
FIG. 4 shows Scheme 2, generally illustrating reactions of $HB^{Me}oCb_2$ with (a) CO, (b) EtOAc, (c) $OPEt_3$, and (d) $[nBu_4N][SbF_6]$.

Lewis acid-base adducts with CO, EtOAc and $OPEt_3$ were prepared to experimentally evaluate the relative Lewis acidity of $HB^{Me}oCb_2$. Scheme 2 shown in FIG. 4 generally illustrates reactions of $HB^{Me}oCb_2$ with (a) CO, (b) EtOAc, (c) $OPEt_3$, and (d) $[nBu_4N][SbF_6]$. While CO binds metals strongly due to synergistic sigma donation from the carbon to metal and back donation from the metal to ligand π* orbital, boranes cannot π back bond and rely purely on sigma donation that precludes binding, except for powerful Lewis acids. Thus, weak CO borane adducts are typically only observed at very low temperatures and/or under a CO environment. Only a few carbonyl borane complexes have been isolated. Exposing a $C_6D_6$ solution of $HB^{Me}oCb_2$ to an atmosphere of CO at 23° C. formed the adduct ($OC{\cdot}BH^{Me}oCb_2$) in quantitative yield. The adduct is resilient in solution under an $N_2$ atmosphere at 25° C. based on $^{1}H$ NMR spectroscopy. The characteristic CO peak is a broad signal at 166.3 ppm in the $^{13}C$ NMR spectrum. The $^{11}B\{^{1}H\}$ NMR spectrum features a resonance with a significant upfield shift of the central boron atom appearing at δ=−17.5 ppm, indicating the formation of a tetracoordinate boron center, which is a doublet at δ=−17.6 ppm (J=96.0 Hz) in the $^{1}H$ coupled $^{11}B$-NMR spectrum. Single crystals of $OC{\cdot}BH^{Me}oCb_2$ were grown and X-ray diffraction studies reveal the boron-carbonco bond length [B(1)-C(7)=1.629(8) Å] is comparable to other electrophilic borane CO adducts [$OC{\cdot}B(CF_3)_3$=1.69 Å; $OC{\cdot}B(CF_2CF_3)_3$=1.618(2) Å; $OC{\cdot}B(CF_2CF_2CF_3)_3$=1.638(5) Å; perfluoropentaphenylborole·CO 1.609(3) Å]. The C—O bond length [1.111(7) Å] is within error of measurement of free CO (1.1281 Å) but the CO stretching frequency in the FT-IR spectrum of $OC{\cdot}BH^{Me}oCb_2$ is at 2207 $cm^{-1}$ in $C_6D_6$, higher than free CO (2143 $cm^{-1}$), and comparable with the perfluoropentaphenylborole·CO (2195 $cm^{-1}$ in $CH_2Cl_2$ solution). The strengthening of the CO bond indicates strong Lewis acidity. Applying vacuum to the solid liberates the carbonyl to regenerate $HB^{Me}oCb_2$. The calculated affinity for $HB^{Me}oCb_2$ with respect to CO is −28 KJ/mol.

In $EtOAc{\cdot}BH^{Me}oCb_2$ (Scheme 2b), the FT-IR C═O stretching frequency is at 1590 $cm^{-1}$, indicating a stronger adduct formation than $B(C_6F_5)_3$ (1648 $cm^{-1}$). The $Et_3PO$ adduct enabled assessment of the Lewis acidity by the Gutmann-Beckett method. The difference in $\delta^{31}P$ chemical shift ($\Delta\delta^{31}P$) of free $Et_3PO$ and $Et_3PO{\cdot}BH^{Me}oCb_2$ is 35.8 and 30.0 ppm in $C_6D_6$ and $CDCl_3$, respectively (Scheme 2c). Interestingly, the $\Delta\delta^{31}P$ values are higher for $HB^{Me}oCb_2$ than the boron Lewis superacids $BoCb_3$ [$\Delta\delta^{31}P$: 34.1 and 27.5 ppm in $C_6D_6$ and $CDCl_3$] and $B(p\text{-}CF_3\text{-}C_6F_4)_3$ [$\Delta\delta^{31}P$:

31.9 ppm in $C_6D_6$]. The higher $\Delta\delta^{31}P$ value for $HB^{Me}oCb_2$ than $BoCb_3$ is believed to result from the decreased sterics at the central boron atom. The % Lewis acid buried volume using the fluoride adducts according to the recent suggested practice from Radius and co-workers returns a value of 64.2% for $HB^{Me}oCb_2$, compared to 71.9% for $BoCb_3$. The % Lewis acid buried volume for $HB(C_6F_5)_2$ is calculated to be 47%. An analogue of $HB^{Me}oCb_2$ without methyl groups on the ortho-carbons reveals the % buried volume decreases by 7.1% to 57.1%.

To experimentally assess the relative fluoride ion affinity (FIA), $HB^{Me}oCb_2$ was treated with [$nBu_4N$][$SbF_6$]. Based on multinuclear NMR ($^1H$, $^1H\{^{11}B\}$, $^{11}B$, and $^{19}F$ $\{^1H\}$ NMR spectroscopy), $HB^{Me}oCb_2$ was consumed within 30 minutes leading to a complex reaction mixture from fluoride ion abstraction from $SbF_6$ (Scheme 2d). This experimentally confirms $HB^{Me}oCb_2$ is a Lewis superacid, in accord with the calculations.

Figure 5:
FIG. 5 shows Scheme 3, an exemplary method for hydroboration of olefins using $HB^{Me}oCb_2$.
Figure 5:
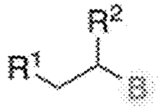
Figure 5:
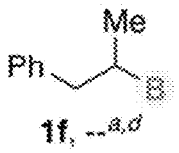
Figure 5:
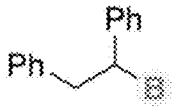
Figure 5:

The powerful Lewis acidity and highly polarized B—H bond imply that $BH^{Me}oCb_2$ might be a more active hydroboration substrate than $HB(C_6F_5)_2$. Scheme 3 shown in FIG. 5 illustrates hydroboration of olefins using $HB^{Me}oCb_2$. Scheme 3 includes the following notes: [a]Reaction condition: 0.10 mmol of olefin, 0.10 mmol of $HB^{Me}oCb_2$, $C_6H_6$ (2 mL), 23° C., 10 min. Isolated yields are mentioned. [b]Reaction condition: 1 atm of ethylene, 0.10 mmol of $HB^{Me}oCb_2$, $C_6H_6$ (2 mL), 23° C., 10 min. [c]Reaction was heated at 80° C. for 60 h. [d]Not observed. [e]Reaction was heated at 120° C. for 36 h in m-xylene. [f]NR=No reaction. First, the classical substrate of styrene (Scheme 3) was attempted. Reaction with $HB^{Me}oCb_2$ led to the anti-Marchkovnikov product 1a in 98% yield within 10 minutes, without any polymerization. Alkenes having an electron-withdrawing arene (—$C_6F_5$) and an aliphatic chain (n-butane-) also provided the anti-Markovnikov products 1b and 1c, within 10 minutes in 94% and 98% yield, respectively. Vinyl silanes behave uniquely towards B—H reagents, often giving a mixture of α- and β-regioselectivities. The reaction of vinyl-TMS with $HB^{Me}oCb_2$ led to the β-isomer (1d) exclusively, in 96% yield. Ethylene, the simplest olefin reacted with $HB^{Me}oCb_2$ at very ambient conditions to give the corresponding product 1e in 98% yield. Internal alkenes are less reactive. Trans-B-methylstyrene required heating to 80° C. and 60 h to obtain 1f' in 90% yield, while the expected product 1f was not observed. Interestingly, trans-stilbene did not react even after heating at 120° C. for 36 h in m-xylene. The sterics of the borane was not detrimental to hydroboration, as $HB^{Me}oCb_2$ is bulky but still a very effective hydroboration reagent.

Figure 6:
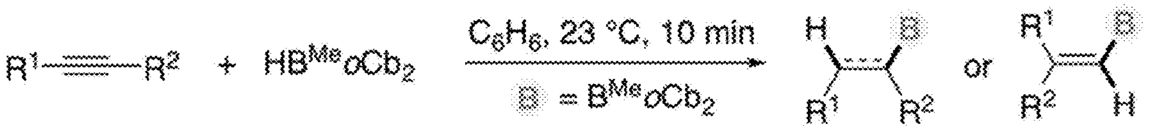
FIG. 6 shows Scheme 4, an exemplary method for hydroboration of alkynes using $HB^{Me}oCb_2$.
Figure 6:
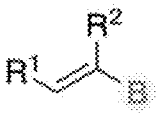
Figure 6:
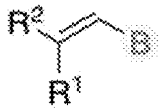

Scheme 4 shown in FIG. 6 demonstrates hydroboration of alkynes using $HB^{Me}oCb_2$. Scheme 4 includes the following notes: [a]Reaction condition: 0.10 mmol of alkyne, 0.10 mmol of $HB^{Me}oCb_2$, $C_6H_6$ (2 mL), 23° C., 10 min. Isolated yields are mentioned. [b]Double hydroboration did not work even at heating condition (80° C.) after 24 h in $C_6D_6$. [c]Isomerization was not observed even after heating at 80° C. for 24 h in $C_6D_6$. [d]Complex reaction mixture was observed. In regard to terminal alkynes, Ph, n-Bu, $SiMe_3$, and Bpin substrates all gave the corresponding products 1h-1k in excellent yields (92-97%). Interestingly, hydroboration of the alkene in 1h-1j did not occur, even at elevated temperature (80° C. for 24 h in $C_6D_6$). This is contrary to Piers' borane that reacts with both multiple bonds. The unactivated internal alkyne, 2-butyne, gave the corresponding hydroboration product 1l in 89% yield. The unsymmetric internal alkyne, PhC=CMe, gave the corresponding hydroboration product 1m in 95% yield. The regioselectivity of 1l and 1m were confirmed by single crystal X-ray diffraction studies. Compounds 1l and 1m did not isomerize to the terminal alkene via boryl migration even after heating at 80° C. for 24 h. The bulky PhC=C*t*Bu gives inverse regioselectivity to furnish 1n in 89% yield, confirmed from a single crystal X-ray diffraction study. Interestingly, the silane substituted internal alkyne PhC≡CSiEt$_3$ gave a unique 1,1-hydroboration product in excellent yield (1o, 90%), where both the hydrogen atom and the —$B^{Me}oCb_2$ group reside on the same carbon atom resulting from 1,2-$SiEt_3$ group migration confirmed by a single crystal X-ray diffraction study. The bulky —$Si^iPr_3$ substituted alkyne produced the 1,1-hydroboration product in 85% yield (1p). Unfortunately, the tin substituted PhC=CSnnBu$_3$ led to a complex reaction mixture (1q).

Figure 7:
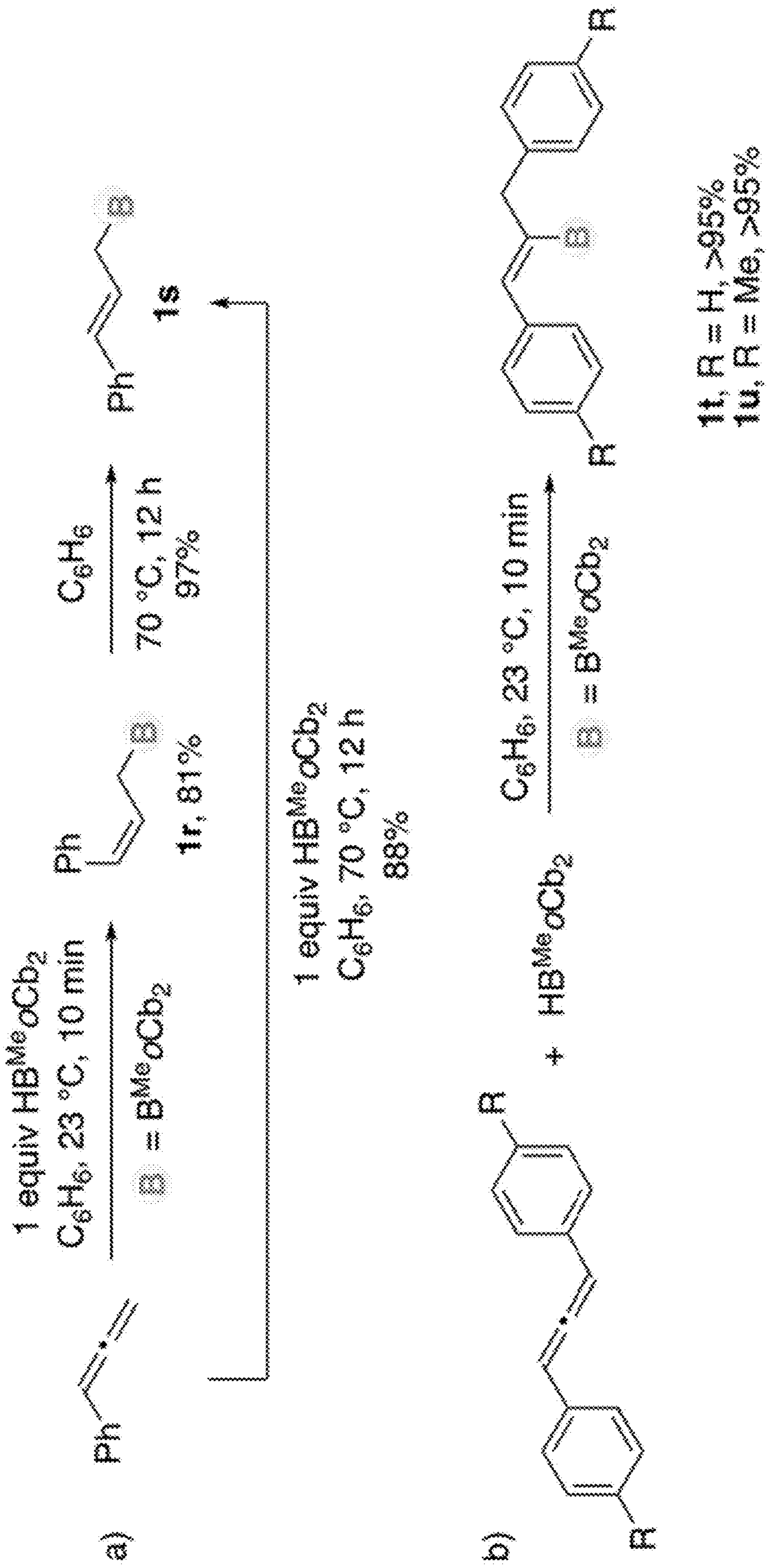
FIG. 7 shows Scheme 5, an exemplary method for hydroboration of allene using $HB^{Me}oCb_2$.

The selective hydroboration of allenes is challenging with most systems suffering from poor regioselectivity. Scheme 5a shown in FIG. 7 illustrates hydroboration of allene using $HB^{Me}oCb_2$. Scheme 5 includes the following notes: [a]Reactions were kept in 0.1 mmol scale and isolated yields are mentioned. Reaction of phenylallene with an equivalent of $HB^{Me}oCb_2$, at 23° C. in $C_6D_6$, gave the corresponding Z-alkenylborane 1r with excellent selectivity (>90% by $^1H$ NMR), and the product isolated in 81% yield (Scheme 5a). The Z-selectivity was confirmed by a single crystal X-ray diffraction study. Heating 1r induced isomerization to the thermodynamic product 1s exclusively in 97% yield when heated to 70° C. in $C_6D_6$ for 12 h. The 1s could be isolated exclusively (88% yield) when phenylallene is reacted with $HB^{Me}oCb_2$ at 70° C. for 12 h in one-pot. Interestingly, both 1r and 1s did not react another equivalent of $HB^{Me}oCb_2$ or phenylallene at room temperature (23° C. for 24 h in $C_6D_6$). Even at elevated temperature, 1s did not react further (80° C. for 24 h in $C_6D_6$). The $HB^{Me}oCb_2$ undergoes regiospefic hydroboration of the internal diarylallene to form 1t and 1u in excellent yields (>95% in each case). Internal allenes show very poor regioselctivity for other secondary boranes and often mixture of products are obtained.

Figure 8:
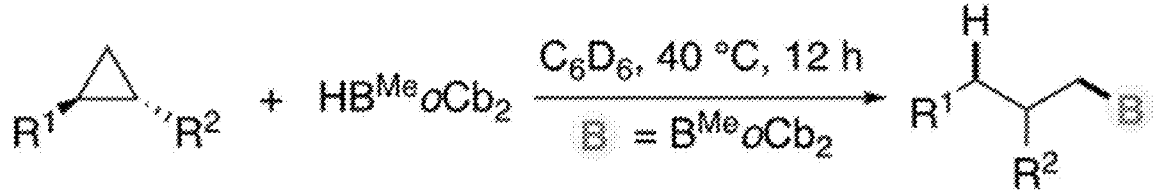
FIG. 8 shows Scheme 6, an exemplary method for hydroboration of cyclopropanes using $HB^{Me}oCb_2$.

Although cyclopropanes do not have a multiple bond, the ring is an unsaturation equivalent, and the strained C—C bond could undergo a formal ring-opening 1,3-hydroboration. Unactivated cyclopropanes are the most common three-membered ring systems found in nature but methods for their selective ring-opening hydroboration are scarce. In 1971, Rickborn and co-workers described that diborane ($B_2H_6$) can react with cyclopropanes to afford alkylboranes at 100° C., albeit with poor selectivity. Recently, Wang and co-workers showed that super electrophilic nature of hydroborenium complexes can facilitate the σ-bond metathesis cyclopropanes to yield 1,3-hydroboration products. Scheme 6 shown in FIG. 8 illustrates hydroboration of cyclopropanes using $HB^{Me}oCb_2$. Scheme 6 includes the following notes: [a]Isolated yields are mentioned. [b]Reaction condition: 0.10 mmol of cyclopropylbenzene, 0.10 mmol of $HB^{Me}oCb_2$, $C_6H_6$ (2 mL), 40° C., 10 h. [c]Reaction condition: 0.10 mmol of 1,2-diphenylcyclopropane, 0.10 mmol of $HB^{Me}oCb_2$, m-Xylene (2 mL), 120° C., 24 h. [d]NR=no reaction. Reaction of $HB^{Me}oCb_2$ with 1 equiv of cyclopropylbenzene in $C_6H_6$ at 40° C. for 10 h led to 1f' as the sole hydroboration product in 88% isolated yield with exquisite regioselectivity. The reaction could be extended to 4-Br—$C_6H_4$— and 4-Ph-$C_6H_4$-substituted cyclopropanes to generate the corresponding products 1v and 1w in 90 and 94% yields, respectively. The sterically crowded 1-naphthyl cyclopropane furnished the 1,3-functionalized propane in 85% yield (1x). The aliphatic benzyl-cyclopropane led to a complex reaction mixture from unselective ring opening (1y). The bulky disubstituted E-1,2-diphenylcyclopropane did not react with $HB^{Me}oCb_2$ despite heating at 120° C. in m-xylene for 24 h (1z).

Given the small library of Lewis acidic boranes, FIAs of model systems of the hydroboration products were computed. For the alkene and cyclopropane products, a bis(1-methyl-o-carboranyl)borane featuring a methyl group ($H_3CB^{Me}oCb_2$) was used that gave a value of 524 KJ/mol. To model the alkyne hydroboration products, $H_2C{=}CHB^{Me}oCb_2$ was used and calculated to be 517 KJ/mol. Notably, these exceed the FIA of $SbF_6$ implying that the hydroboration products in this work are LSAs.

Figure 9:
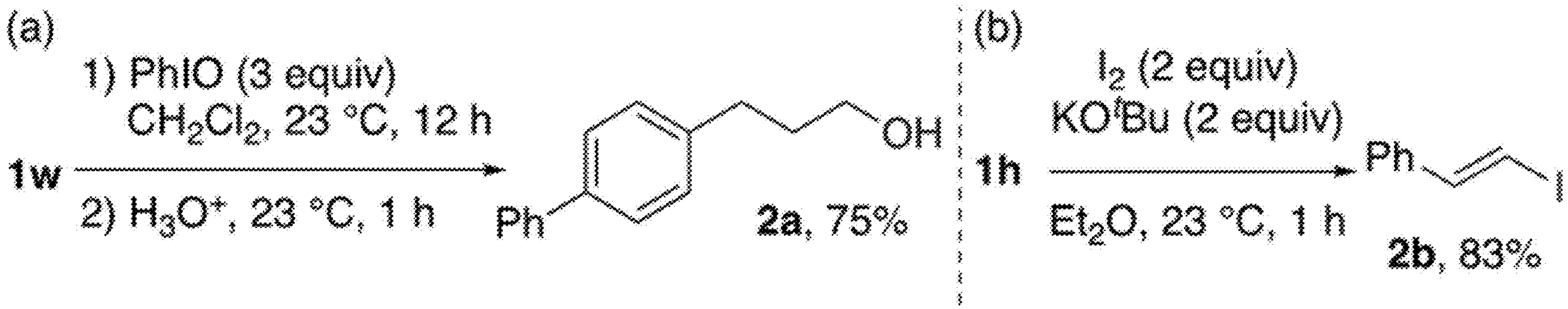
FIG. 9 shows Schemes 7a and 7b, exemplary methods for transformation of the —$B^{Me}oCb_2$ moiety to other functional groups, such as an alcohol or an iodo-compound.

Preliminary transformations of the hydroboration products were conducted to determine the potential of the —$B^{Me}oCb_2$ moiety as a functional handle. Scheme 7 shown in FIG. 9 illustrates the utility of the —$B^{Me}oCb_2$ moiety as a functional handle. Treating 1w with iodosobenzene, following an acid hydrolysis, led to corresponding alcohol 2a in 75% yield (Scheme 7a). The alkene can be preserved in the conversion of alkyne hydroboration product 1h to the corresponding iodo-compound 2b by reaction with $KO^tBu$ and $I_2$, in 83% yield (Scheme 7b). This exemplifies that —$B^{Me}oCb_2$ can be transformed to other functional groups under mild conditions.

Examples and Supporting Information

General Details. All manipulations were performed under an inert atmosphere in a nitrogen filled MBraun Unilab glove box or using standard Schlenk techniques, unless specified. Chloroform-d and benzene-$d_6$ for NMR spectroscopy were purchased from Cambridge Isotope Laboratories, Inc., dried by stirring for 5 days over $CaH_2$, distilled, and stored over 4 Å molecular sieves. All other solvents were purchased from commercial sources as anhydrous grade, dried further using a JC Meyer Solvent System with dual columns packed with solvent-appropriate drying agents, and stored over 3 or 4 Å molecular sieves. The following chemicals: o-methyl-carborane, nBuLi, $BBr_3$, $BCl_3$, triethylphosphine oxide, and CO, were purchased from commercial sources and used without further purification. The alkene, alkynes, allenes, and cyclopropanes are either purchased or synthesized from literature known methods. The synthesized molecules are cited. Multinuclear NMR spectra ($^1H$, $^{13}C$, $^{31}P\{^1H\}$, $^{11}B$, $^{11}B\{^1H\}$) were recorded on a Bruker Avance III HD 400 MHz or 600 MHz instrument. High Resolution mass spectra (HRMS) were obtained in the Baylor University Mass Spectrometry Center on a Thermo Scientific Q Exactive spectrometer. Elemental (C and H) analyses were performed by Atlantic Microlab, Inc. (Norcross, GA). Melting/decomposition points were determined with a Thomas Hoover Uni-melt capillary melting point apparatus and are uncorrected. FT-IR spectra were recorded on a Bruker Alpha ATR FT-IR spectrometer on solid samples. Single crystal X-ray diffraction data were collected on a Bruker Apex III-CCD detector using Mo-Kα radiation (2=0.71073 Å). Crystals were selected under paratone oil, mounted on MiTeGen micromounts, and immediately placed in a cold stream of $N_2$. Structures were solved and refined using SHELXTL and figures produced using OLEX2.

Preparation of $ClB^{Me}oCb_2$. To a stirred toluene (25 mL) solution of 1-methyl-o-carborane (10.00 mmol, 1.5825 g) in a Schlenk flask at −78° C., nBuLi (10.00 mmol, 4.00 mL) was slowly added under nitrogen. The reaction mixture was then allowed to warm to 23° C. and stirred for another 4 hours. A 1 M solution of $BCl_3$ in dodecane (5.00 mmol, 5.00 mL) was slowly added to the reaction mixture via a syringe at −78° C. over a period of 10 minutes. The reaction mixture was then stirred for 4 days at 23° C. After confirming completion of the reaction by $^1H$ and $^{11}B$ NMR spectroscopy of an aliquot, 20 mL of dichloromethane was added and the reaction mixture filtered through a small pad of celite, which was washed with dichloromethane (2×5 mL). The volatiles were removed from the combined filtrate under vacuum. The solids were dissolved in 1 mL dichloromethane and subsequently 5 mL cold n-pentane was added under stirring that induced precipitation which was filtered through a glass frit and the solids washed with cold n-pentane (2×2 mL). The residue was dried under vacuum to give $ClB^{Me}oCb_2$ as white solid. Yield: 31%, 567 mg; mp: 142-145° C.; $^1H$ NMR (400 MHz, $C_6D_6$): δ=3.85-1.65 (m, 20H), 1.27 (s, 1H) ppm; $^1H\{^{11}B\}$ NMR (400 MHz, $C_6D_6$): δ=3.22 (s, 2H), 2.88 (s, 4H), 2.78 (s, 2H), 2.64 (s, 4H), 2.39 (s, 8H), 1.28 (s, 6H) ppm; $^{13}C\{^1H\}$ NMR (101 MHz, $C_6D_6$): δ=79.9, 73.1, 25.3 ppm; $^{11}B\{^1H\}$ NMR (128 MHz, $C_6D_6$): δ=59.7 (br. s), 4.3 (s), −4.6 (s), −5.6 to −11.9 (m) ppm; $^{11}B$ NMR (128 MHz, $C_6D_6$): δ=59.7 (br. s), 4.29 (d, J=151.8 Hz), −2.4 to −11.9 (m) ppm; FT-IR (ranked intensity, $cm^{-1}$): 2571 (1), 1373 (11), 1173 (3), 1134 (7), 1071 (14), 1027 (15), 1002 (9), 953 (5), 836 (4), 796 (6), 728 (2), 710 (13), 682 (8), 649 (12), 545 (10); HRMS(−ESI): calcd 405.3390 for $C_6H_{27}B_{21}Cl$ $[M+H]^-$ found 405.3390; Elemental analysis: calcd C, 19.98, H, 7.27 for $C_6H_{26}B_{21}Cl$; found: C, 20.08, H, 7.39.

Preparation of $BrB^{Me}oCb_2$. To a stirred toluene (25 mL) solution of 1-methyl-o-carborane (10.00 mmol, 1.5825 g) in a Schlenk flask at −78° C., nBuLi (10.00 mmol, 4.00 mL) was added slowly under nitrogen. The reaction mixture was allowed to warm to 23° C. and stirred for another 4 hours. A toluene solution (5 mL) of $BBr_3$ (5.00 mmol, 474.0 μL) was slowly added to the reaction mixture via a syringe at −78° C. over a period of 10 minutes. The reaction mixture was then stirred for 4 days at 23° C. After confirming completion of the reaction by $^1H$ and $^{11}B$ NMR spectroscopy of an aliquot, 20 mL dichloromethane was added, and the reaction mixture filtered through a small pad of celite and further washed with dichloromethane (2×5 mL). The volatiles were removed from the combined filtrate under vacuum. The solids were dissolved in 1 mL dichloromethane and subsequently 10 mL cold n-pentane was added under stirring that induced precipitation. The precipitate was collected by filtration with a glass frit and washed with cold n-pentane (2×2 mL). The solids were dried under vacuum to give $BrB^{Me}oCb_2$ as white solid. Single crystals for X-ray diffraction studies were grown by vapor diffusion of a dichloromethane solution of $BrB^{Me}oCb_2$ into toluene. Yield: 33%, 671 mg; mp: 170-172° C.; $^1H$ NMR (400 MHz, $C_6D_6$): δ=3.63-1.86 (m, 20H), 1.30 (s, 6H) ppm; $^1H\{^{11}B\}$ NMR (400 MHz, $C_6D_6$): δ=3.22 (s, 2H), 2.90 (s, 4H), 2.86-2.64 (m, 6H), 2.55-2.20 (m, 8H), 1.32 (s, 6H) ppm; $^{13}C\{^1H\}$ NMR (101 MHz, $C_6D_6$): δ=80.3, 76.2, 25.2 ppm; $^{11}B\{^1H\}$ NMR (128 MHz, $C_6D_6$): δ=64.9 (br. s), 4.3 (s), −0.3 to −14.9 (m) ppm; $^{11}B$ NMR (128 MHz, $C_6D_6$): δ=64.9 (s), 4.3 (d, J=149.8 Hz), −0.3 to −14.9 (m) ppm; FT-IR (ranked intensity, $cm^{-1}$): 2771 (1), 1444 (13), 1388 (8), 1168 (3), 1127 (6), 1065 (12), 1024 (9), 941 (14), 918 (5), 810 (4), 729 (2), 708 (15), 681 (10), 648 (11), 543 (7); HRMS(−ESI): calcd 405.3390 for $C_6H_{27}B_{21}Br$ $[M+H]^-$ found 405.3390; Elemental analysis: calcd C, 17.79, H, 6.47 for $C_6H_{26}B_{21}Br$; found: C, 19.12, H, 6.93.

Preparation of $HB^{Me}oCb_2$ from $XB^{Me}oCb_2$ (X=Cl, Br). To a stirred benzene (5 mL) solution of $XB^{Me}oCb_2$ (X=Cl, Br; 0.500 mmol) in a vial, $HSiEt_3$ (0.55 mmol, 88.0 μL) was slowly added at 23° C. and stirred for 1 h. After completion of the reaction monitored by $^{1}H$, and $^{11}B$ NMR spectroscopy of an aliquot, the volatiles were removed under vacuum to give a white solid, which was washed with 1 mL of cold n-pentane. The residue was dried under vacuum to give pure $HB^{Me}oCb_2$ as white solid. Single crystals for X-ray diffraction studies were grown from a dichloromethane solution of $HB^{Me}oCb_2$ by vapor diffusion into toluene. Yield: from $BrB^{Me}oCb_2$: 96%, 157 mg; from $ClB^{Me}oCb_2$: 93%, 152 mg; mp: 165-167° C.; $^{1}H$ NMR (400 MHz, $C_6D_6$): δ=5.48 (br. s, 1H), 3.99-1.53 (m, 20H), 1.22 (s, 6H) ppm; $^{1}H\{^{11}B\}$ NMR (400 MHz, $C_6D_6$): δ=5.49 (s, 1H), 3.30 (s, 2H), 2.86 (s, 2H), 2.78 (s, 4H), 2.53 (s, 4H), 2.40 (s, 4H), 2.07 (s, 4H), 1.26 (s, 6H) ppm; $^{13}C\{^{1}H\}$ NMR (101 MHz, $C_6D_6$): δ=77.1, 72.7, 24.7 ppm; $^{11}B$ $\{^{1}H\}$ NMR (128 MHz, $C_6D_6$): δ=70.9 (br. s), 5.4 (s), −4.0 (s), −6.9 (s), −8.9 (s), −9.7 (s) ppm; $^{11}B$ NMR (128 MHz, $C_6D_6$): δ=70.9 (br. s), 5.4 (d, J=149.2 Hz), −4.01 (d, J=151.1 Hz), −5.5 to −12.7 (m) ppm; FT-IR (ranked intensity, cm $^{-1}$): 3632 (14), 3477 (8), 2555 (1), 1600 (7), 1444 (4), 1385 (5), 1255 (13), 1142(2), 1055 (9), 1018 (12), 911 (11), 805 (10), 728 (3), 687 (15), 669 (6); HRMS(−ESI): calcd 327.4285 for $C_6H_{28}B_{21}$ $[M+H]^-$ found 327.4294; Elemental analysis: calcd C, 22.09, H, 8.34 for $C_6H_{27}B_{21}$; found: C, 21.51, H, 8.60.

Preparation of $OC{\cdot}BH^{Me}oCb_2$. An NMR tube with J-Young tap was charged with $HB^{Me}oCb_2$ (10.0 mg, 0.031 mmol) dissolved in 1 mL $C_6D_6$. The mixture was degassed by three freeze pump-thaw cycles. At 23° C., the tube was charged with 1 atm CO and agitated. The reaction was complete within 10 minutes as indicated by $^{1}H$ and $^{11}B$ NMR spectroscopy. $^{1}H$ NMR (400 MHz, $C_6D_6$): δ=3.69-1.77 (m, 21H), 1.25 (s, 1H) ppm; $^{1}H\{^{11}B\}$ NMR (400 MHz, $C_6D_6$): δ=3.11 (s, 2H), 2.81 (s, 8H), 2.96-2.61 (m, 8H), 2.00 (s, 3H), 1.25 (s, 6H) ppm; $^{13}C\{^{1}H\}$ NMR (101 MHz, $C_6D_6$): δ=166.3, 77.3, 68.4, 24.8 ppm; $^{11}B\{^{1}H\}$ NMR (128 MHz, $C_6D_6$): δ=1.0 (s), −4.3 (s), −5.8 to −12.1 (m), −17.5 (s) ppm; $^{11}B$ NMR (128 MHz, $C_6D_6$): δ=1.0 (d, J=150.4 Hz), −4.3 (d, J=151.7 Hz), −5.7 to −12.1 (m), −17.6 (d, J=97.1 Hz); FT-IR ($\nu_{CO}$)=2207 cm$^{-1}$; HRMS(+ESI): calcd 354.4156 for $C_7H_{27}B_{21}O$ $[M]^+$ found 354.4147.

Preparation of $EtOAc{\cdot}BH^{Me}oCb_2$: To a stirred $C_6D_6$ (2 mL) solution of $HB^{Me}oCb^2$ (0.100 mmol, 32.6 mg) in a vial, ethyl acetate (EtOAc, 0.105 mmol, 10.3 μL) was added by a micropipette at 23° C. The reaction was complete within 10 minutes (monitored by the $^{1}H$ and $^{11}B$ NMR spectroscopy). The volatiles were removed under vacuum to give a white solid which was washed with 1 mL cold n-pentane. The residue was dried under vacuum to give pure $EtOAc{\cdot}BH^{Me}oCb_2$ as a white solid. Single crystals for X-ray diffraction studies were grown from a dichloromethane solution of $EtOAc{\cdot}BH^{Me}oCb_2$ by vapor diffusion into toluene. Yield: 93%, 38 mg; mp: 183-185° C.; $^{1}H$ NMR (400 MHz, $C_6D_6$): δ=3.82 (q, J=7.2 Hz, 2H), 3.66-1.87 (m, 20H), 1.55 (s, 6H), 1.35 (s, 3H), 0.57 (t, J=7.1 Hz, $^{3}H$) ppm; $^{1}H\{^{11}B\}$ NMR (400 MHz, $C_6D_6$): δ=3.83 (q, J=7.3 Hz, 2H), 3.21 (s, 2H), 3.03-2.13 (m, 15H), 2.13 (s, 2H), 1.83 (s, 2H), 1.56 (s, 6H), 1.37 (s, 3H), 0.59 (t, J=7.2 Hz, 3H) ppm; $^{13}C\{^{1}H\}$ NMR (101 MHz, $C_6D_6$): δ=183.8, 78.5, 77.4, 70.1, 25.2, 18.6, 13.2 ppm; $^{11}B\{^{1}H\}$ NMR (128 MHz, $C_6D_6$): δ=0.3 (s), −5.1 (s), −6.4 to −13.0 (m) ppm; $^{11}B$ NMR (128 MHz, $C_6D_6$): δ=0.3 (d, J=150.5 Hz), −5.1 (d, J=149.1 Hz), −6.4 to −13.1 (m); FT-IR (ranked intensity, cm $^{-1}$): 2560 (2), 1476 (7), 1590 (1), 1383 (6), 1340 (5), 1147 (12), 1122 (3), 1033 (9), 856 (11), 812 (8), 729 (4), 687 (13), 597 (15), 580 (14), 557 (10); HRMS(±ESI): The adduct peak was not observed in HRMS.

Determination of the Lewis acidity of $HB^{Me}oCb_2$ using Gutmann-Beckett method: A solution of $Et_3PO$ (2.7 mg, 0.02 mmol, in 0.5 mL of $C_6D_6$ or $CDCl_3$) was added to a solution of $HB^{Me}oCb_2$ (6.5 mg, 0.02 mmol, in 0.5 mL of $C_6D_6$ or $CDCl_3$) in an NMR tube. The NMR tube was agitated and the $^{31}P$ $\{^{1}H\}$ spectrum recorded.

Reaction of $[nBu_4N][SbF_6]$ with $HB^{Me}oCb_2$. A vial was charged with $HB^{Me}oCb_2$ (0.05 mmol, 16.3 mg) and dissolved in 500 μL $CDCl_3$. A $CDCl_3$ solution of $[nBu_4N][SbF_6]$ (0.05 mmol, 23.9 mg, 0.5 mL) was added to the vial and stirred for 30 minutes. The $HB^{Me}oCb_2$ was consumed within 30 min (based on monitoring by in situ $^{1}H$ and $^{1}H\{^{11}B\}$ NMR spectroscopy) with multiple products formed as indicated by $^{1}H$, $^{1}H\{^{11}B\}$, $^{11}B$, and $^{19}F\{^{1}H\}$ NMR spectroscopy.

General Procedure for the Hydroboration of olefins with $HB^{Me}oCb_2$. A benzene (1 mL) solution of alkyne (0.10 mmol) was added to a benzene solution (1 mL) of $HB^{Me}oCb_2$ (32.6 mg, 0.10 mmol) at 23° C. The reaction mixture was stirred for 10 min for terminal alkynes and 30 min for internal alkynes. After completion of the reaction as monitored by the 1H, and 1H{11B} NMR spectroscopy, the volatiles were removed under vacuum. The solids were then washed with 1 mL cold n-pentane and dried under vacuum to give the products shown below. Any deviation from the standard reaction conditions and isolation techniques are discussed below.

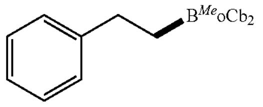

Compound 1a: white solid; yield: 98%, 42 mg; $^{1}H$ NMR (400 MHz, $C_6D_6$): δ=7.19-7.17 (m, 2H), 7.13-7.07 (m, 1H), 7.06-7.02 (m, 2H), 3.81-1.84 (m, 24H), 1.24 (s, 6H) ppm; $^{1}H\{^{11}B\}$ NMR (400 MHz, $C_6D_6$): δ=7.21-7.15 (m, 2H), 7.13-7.08 (m, 1H), 7.07-7.04 (m, 2H), 3.28 (s, 2H), 3.00 (s, 4H), 2.85 (s, 4H), 2.76 (s, 2H), 2.63-2.56 (m, 2H), 2.45 (s, 4H), 2.34 (s, 4H), 2.07-1.98 (m, 2H), 1.26 (s, 6H) ppm; $^{13}C\{^{1}H\}$ NMR (101 MHz, $C_6D_6$): δ=141.7, 129.3, 127.2, 79.9, 75.2, 41.9, 31.5, 25.2 ppm (one carbon peak merged in the $C_6D_6$ region); $^{11}B$ $\{^{1}H\}$ NMR (128 MHz, $C_6D_6$): δ=76.5 (br. s), 3.8 (s), −1.0 to −15.1 (m) ppm; $^{11}B$ NMR (128 MHz, $C_6D_6$): δ=76.5 (br. s), 3.8 (d, J=148.7 Hz), −5.6 to −15.1 (m) ppm; HRMS (+ESI): calcd 405.3390 for $C_6H_{27}B_{21}Br$ $[M+H]^-$ found 405.3390.

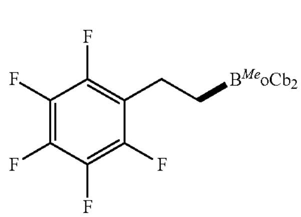

Compound 1b: white solid, yield: 94%, 49 mg; $^{1}H$ NMR (400 MHz, $C_6D_6$): 8=3.66-1.44 (m, 30H) ppm; $^{1}H\{^{11}B\}$ NMR (400 MHz, $C_6D_6$): 8-2.83-2.58 (m, 6H), 2.41 (s, 2H), 2.27 (s, 4H), 2.12 (s, 4H), 2.06-1.96 (m, 6H), 1.90 (s, 2H), 1.76 (s, 6H) ppm; $^{13}C\{^{1}H\}$ NMR (101 MHz, $C_6D_6$): δ=145.0 (dm, J=246.7 Hz), 141.8 (m), 139.2 (m), 136.6 (m), 137.9 (dm, J=256.1 Hz), 114.5 (tm, J=16.6 Hz), 79.9, 74.7, 37.6, 26.1, 18.8 ppm (some of the peaks belonging to the —$C_6F_5$ group merged with each other); $^{11}$B{$^{1}$H} NMR (128 MHz, $C_6D_6$): δ=77.6 (br. s), 3.8 (s), −0.7 to −15.5 (m) ppm; $^{11}$B NMR (128 MHz, $C_6D_6$): δ=77.6 (br. s), 3.8 (d, J=150.2 Hz), −5.6 to −15.6 (m) ppm; $^{19}$F NMR (376 MHz, $C_6D_6$): δ=−142.93 (dd, J=22.4, 8.2 Hz), −155.37 (t, J=20.8 Hz), −161.15 (td, J=22.1, 8.0 Hz) ppm; HRMS (+ESI): calcd 405.3390 for $C_6H_{27}B_{21}Br$ $[M+H]^-$ found 405.3390.

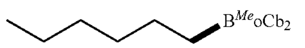

Compound 1c: white solid; yield: 98%, 40 mg; $^{1}$H NMR (400 MHz, $C_6D_6$): δ=3.49-1.82 (m, 28H), 1.51-1.48 (m, 4H), 1.38-1.28 (m, 4H), 0.96-0.91 (m, 3H) ppm; $^{1}$H{$^{11}$B} NMR (400 MHz, $C_6D_6$): δ=2.78 (s, 4H), 2.57 (s, 2H), 2.42 (s, 4H), 2.28 (s, 4H), 2.22 (s, 4H), 2.09 (s, 2H), 1.95-1.93 (m, 8H), 1.52-1.43 (m, 4H), 1.32-1.28 (h, J=3.3 Hz, 4H), 0.95-0.83 (m, 3H) ppm; $^{13}$C{$^{1}$H} NMR (101 MHz, $C_6D_6$): δ=13C NMR (101 MHz, $CDCl_3$) δ 79.4, 75.0, 39.2, 33.3, 31.3, 25.9, 25.5, 22.7, 14.2 ppm; $^{11}$B{$^{1}$H} NMR (128 MHz, $C_6D_6$): δ=0.3 (s), −5.7 (s), −7.7 to −10.1 (s) ppm; $^{11}$B NMR (128 MHz, $C_6D_6$): δ=0.26 (d, J=151.1 Hz), −5.07 (d, J=149.1 Hz), −6.49 to −12.39 (m) ppm; HRMS (+ESI): calcd 405.3390 for $C_6H_{27}B_{21}Br$ $[M+H]^-$ found 405.3390.

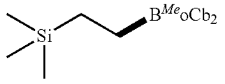

Compound 1d: white solid; yield: 96%, 41 mg; $^{1}$H NMR (400 MHz, $C_6D_6$): δ=3.82 (q, J=7.2 Hz, 2H), 1.87-3.66 (m, 20H), 1.55 (s, 6H), 1.35 (s, 3H), 0.57 (t, J=7.1 Hz, 3H) ppm; $^{1}$H{$^{11}$B} NMR (400 MHz, $C_6D_6$): δ=3.83 (q, J=7.3 Hz, 2H), 3.21 (s, 2H), 2.75-3.05 (m, 8H), 2.72 (s, 1H), 2.62-2.44 (m, 6H), 2.13 (s, 2H), 1.83 (s, 2H), 1.56 (s, 6H), 1.37 (s, 3H), 0.59 (t, J=7.2 Hz, 3H) ppm; $^{13}$C{$^{1}$H} NMR (101 MHz, $C_6D_6$): δ=183.8, 78.5, 77.4, 70.1, 25.2, 18.6, 13.2 ppm; $^{11}$B{$^{1}$H} NMR (128 MHz, $C_6D_6$): δ=0.3 (s), −5.7 (s), −7.7 to −10.1 (s) ppm; $^{11}$B NMR (128 MHz, $C_6D_6$): δ=0.26 (d, J=151.1 Hz), −5.07 (d, J=149.1 Hz), −6.49 to −12.39 (m) ppm; HRMS (−ESI): calcd 425.4837 for $C_{11}H_{37}B_{21}Si$ $[M+H]^-$ found 425.4847.

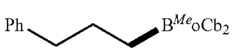

Compound 1f': Reaction was kept at 80° C. for 60 hours. White solid; Yield: 90%, 40 mg; $^{1}$H NMR (400 MHz, $C_6D_6$): δ=3.82 (q, J=7.2 Hz, 2H), 1.87-3.66 (m, 20H), 1.55 (s, 6H), 1.35 (s, 3H), 0.57 (t, J=7.1 Hz, 3H) ppm; $^{1}$H{$^{11}$B} NMR (400 MHz, $C_6D_6$): δ=3.83 (q, J=7.3 Hz, 2H), 3.21 (s, 2H), 2.75-3.05 (m, 8H), 2.72 (s, 1H), 2.62-2.44 (m, 6H), 2.13 (s, 2H), 1.83 (s, 2H), 1.56 (s, 6H), 1.37 (s, 3H), 0.59 (t, J=7.2 Hz, 3H) ppm; $^{13}$C{$^{1}$H} NMR (101 MHz, $C_6D_6$): δ=183.8, 78.5, 77.4, 70.1, 25.2, 18.6, 13.2 ppm; $^{11}$B {$^{1}$H} NMR (128 MHz, $C_6D_6$): δ=0.3 (s), −5.7 (s), −7.7 to −10.1 (s) ppm; $^{11}$B NMR (128 MHz, $C_6D_6$): δ=0.26 (d, J=151.1 Hz), −5.07 (d, J=149.1 Hz), −6.49 to −12.39 (m) ppm; HRMS (+ESI): calcd 405.3390 for $C_6H_{27}B_{21}Br$ $[M+H]^-$ found 405.3390.

Hydroboration of alkynes with $HB^{Me}oCb_2$. A benzene (1 mL) solution of alkyne (0.10 mmol) was added to a benzene solution (1 mL) of $HB^{Me}oCb_2$ (32.6 mg, 0.10 mmol) at 23° C. The reaction mixture was stirred for 10 min for terminal alkynes and 30 min for internal alkynes. After completion of the reaction as monitored by the $^{1}$H, and $^{1}$H{$^{11}$B} NMR spectroscopy, the volatiles were removed under vacuum. The solids were then washed with 1 mL cold n-pentane and dried under vacuum to give the product.

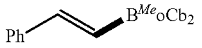

Compound 1h: pale brown solid; yield: 96%, 41 mg; $^{1}$H NMR (400 MHz, $C_6D_6$): δ=7.80 (d, J=16.0 Hz, 1H), 7.27 (d, J=16.0 Hz, 1H), 7.24-7.21 (m, 2H), 7.08-7.03 (m, 1H), 7.02-6.96 (m, 2H), 3.58-2.14 (m, 20H), 1.31 (s, 6H) ppm; $^{1}$H{$^{11}$B} NMR (400 MHz, $C_6D_6$): δ=7.80 (d, J=16.0 Hz, 1H), 7.32-7.21 (m, 3H), 7.10-6.96 (m, 3H), 3.27 (s, 2H), 3.01 (s, 4H), 2.94 (s, 4H), 2.86 (s, 2H), 2.53 (s, 4H), 2.47 (s, 4H), 1.32 (s, 6H) ppm; $^{13}$C{$^{1}$H} NMR (101 MHz, $C_6D_6$): δ=158.4, 138.1, 135.5, 132.9, 129.6, 129.5, 79.0, 75.2, 24.8 ppm; $^{11}$B{$^{1}$H} NMR (128 MHz, $C_6D_6$): δ=62.1 (br. s), 3.3 (s), −0.2 to −15.9 (m) ppm; $^{11}$B NMR (128 MHz, $C_6D_6$): δ=62.1 (br. s), 3.2 (d, J=147.2 Hz), −0.4 to −16.2 (m) ppm; HRMS (−ESI): calcd 429.4754 for $C_{14}H_{34}B_{21}$ $[M+H]^-$ found 429.4758.

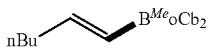

Compound 1i: white solid; yield: 96%, 39 mg; $^{1}$H NMR (400 MHz, $CDCl_3$): δ=7.33-7.24 (m, 1H), 6.71 (d, J=20.0 Hz, 1H), 3.16-1.72 (m, 28H), 1.62-1.50 (m, 2H), 1.46-1.33 (m, 2H), 0.97 (t, J=8.0 Hz, 3H) ppm; $^{1}$H{$^{11}$B} NMR (400 MHz, $CDCl_3$): δ=7.34-7.25 (m, 1H), 6.73 (d, J=16.0 Hz, 1H), 2.88 (s, 4H), 2.59 (s, 2H), 2.53-2.37 (m, 8H), 2.32 (s, 6H), 2.18 (s, 2H), 1.91 (s, 6H), 1.61-1.53 (m, 2H), 1.46-1.37 (m, 2H), 1.04-0.94 (m, 3H) ppm; $^{13}$C{$^{1}$H} NMR (101 MHz, $CDCl_3$): δ=166.4, 142.3, 78.4, 74.5, 37.6, 30.0, 25.4, 22.8, 14.0 ppm; $^{11}$B{$^{1}$H} NMR (128 MHz, $CDCl_3$): δ=65.3 (br. s), 2.8 (s), −0.9 to −16.4 (m) ppm; $^{11}$B NMR (128 MHz, $CDCl_3$): δ=65.3 (br. s), 2.8 (d, J=138.2 Hz), −1.0 to −16.4 (m) ppm; HRMS (−ESI): calcd 409.5067 for $C_{12}H_{38}B_{21}$ $[M+H]^-$ found 409.5091.

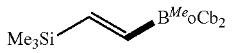

Compound 1j: white solid; yield: 97%, 41 mg; $^{1}$H NMR (400 MHz, $C_6D_6$): δ=6.94 (d, J=24.0 Hz, 1H), 6.76 (d, J=24.0 Hz, 1H), 3.60-1.89 (m, 20H), 1.33 (s, 6H), −0.05 (s, 9H) ppm; $^{1}$H{$^{11}$B} NMR (400 MHz, $C_6D_6$): δ=6.94 (d, J=24.0 Hz, 1H), 6.76 (d, J=20.0 Hz, 1H), 3.27 (s, 2H), 2.94 (s, 4H), 2.86-2.75 (m, 6H), 2.50 (s, 4H), 2.44 (s, 4H), 1.34 (s, 6H), −0.05 (s, 9H) ppm; $^{13}$C{$^{1}$H} NMR (101 MHz, $C_6D_6$): δ=157.5, 155.9, 79.0, 74.0, 25.3, −2.5 ppm; $^{11}$B{$^{1}$H} NMR (128 MHz, $C_6D_6$): δ=68.5 (br. s), 4.0 (s), −0.1 to −16.2 (m) ppm; $^{11}$B NMR (128 MHz, $C_6D_6$): δ=68.5 (br. s), 4.0 (d, J=149.8 Hz), −0.2 to −16.2 (m) ppm; HRMS (−ESI): calcd 425.4837 for $C_{11}H_{38}B_{21}Si$ $[M+H]^-$ found 425.4837.

Compound 1k: white solid; yield: 92%, 44 mg; $^1H$ NMR (400 MHz, $CDCl_3$): δ=7.40 (d, J=20.0 Hz, 1H), 6.34 (d, J=20.0 Hz, 1H), 2.96-1.74 (m, 26H), 1.32 (s, 12H) ppm; $^1H\{^{11}B\}$ NMR (400 MHz, $CDCl_3$): δ=7.40 (d, J=20.0 Hz, 1H), 6.34 (d, J=20.0 Hz, 1H), 2.78 (s, 4H), 2.62 (s, 2H), 2.41 (s, 4H), 2.37 (s, 4H), 2.29 (s, 4H), 2.19 (s, 2H), 1.93 (s, 6H), 1.33 (s, 12H) ppm; $^{13}C\{^1H\}$ NMR (101 MHz, $CDCl_3$): δ=159.4, 84.7, 78.8, 73.4, 26.0, 25.0 ppm; $^{11}B$ $\{^1H\}$ NMR (128 MHz, $CDCl_3$): δ=74.6 (br. s), 30.0 (br. s), 3.7 (s), −0.1 to −16.1 (m) ppm; $^{11}B$ NMR (128 MHz, $CDCl_3$): δ=74.3 (br. s), 30.0 (br. s), 3.7 (d, J=149.8 Hz), −0.5 to −16.1 (m) ppm; HRMS (−ESI): calcd 479.5294 for $C_{14}H_{41}B_{22}O_2$ $[M+H]^-$ found 479.5302.

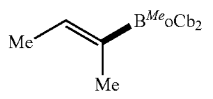

Compound 1l: white solid; yield: 89%, 34 mg; $^1H$ NMR (400 MHz, $CDCl_3$): δ=5.59-5.48 (m, 1H), 3.04-1.66 (m, 32H) ppm; $^1H\{^{11}B\}$ NMR (400 MHz, $CDCl_3$): δ=5.59-5.49 (m, 1H), 2.72 (s, 2H), 2.67 (s, 2H), 2.62 (s, 2H), 2.39 (s, 8H), 2.29 (s, 4H), 2.17 (s, 2H), 2.01 (s, 6H), 1.83 (s, 3H), 1.78 (d, J=4.0 Hz, 3H) ppm; $^{13}C\{^1H\}$ NMR (101 MHz, $CDCl_3$): δ=144.1, 131.9, 80.0, 74.3, 26.4, 17.1, 13.9 ppm; $^{11}B\{^1H\}$ NMR (128 MHz, $CDCl_3$): δ=70.1 (br. s), 3.7 (s), −0.2 to −15.8 (m) ppm; $^{11}B$ NMR (128 MHz, $CDCl_3$): δ=70.1 (br. s), 3.7 (d, J=144.6 Hz), −0.3 to −15.2 (m) ppm; HRMS (−ESI): calcd 381.4754 for $C_{10}H_{34}B_{21}$ $[M+H]^-$ found 381.4772.

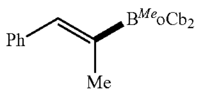

Compound 1m: white solid; yield: 95%, 42 mg; $^1H$ NMR (400 MHz, $CDCl_3$): δ=7.48-7.39 (m, 2H), 7.39-7.29 (m, 3H), 6.35 (s, 1H), 3.12-1.94 (m, 29H) ppm; $^1H\{^{11}B\}$ NMR (400 MHz, $CDCl_3$): δ=7.46-7.39 (m, 2H), 7.38-7.28 (m, 2H), 6.35 (s, 1H), 2.81 (s, 4H), 2.66 (s, 2H), 2.51 (s, 2H), 2.45 (s, 6H), 2.33 (s, 2H), 2.30 (s, 2H), 2.20 (s, 2H), 2.10-2.09 (m, 9H) ppm; $^{13}C\{^1H\}$ NMR (101 MHz, $CDCl_3$): δ=144.3, 135.3, 133.7, 129.3, 128.9, 128.5, 80.3, 74.2, 26.6, 18.7 ppm; $^{11}B\{^1H\}$ NMR (128 MHz, $CDCl_3$): δ=72.6 (br. s), 4.0 (s), −0.2 to −15.8 (m) ppm; $^{11}B$ NMR (128 MHz, $CDCl_3$): δ=72.6 (br. s), 4.0 (d, J=139.5 Hz), −0.2 to −15.8 (m) ppm; HRMS (−ESI): calcd 443.4911 for $C_{15}H_{36}B_{21}$ $[M+H]^-$ found 443.4924.

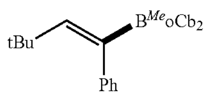

Compound 1n: white solid; yield: 89%, 43 mg; $^1H$ NMR (400 MHz, $CDCl_3$): δ=7.46-7.40 (m, 2H), 7.38-7.31 (m, 3H), 5.67 (s, 1H), 3.00-1.92 (m, 26H), 1.02 (s, 9H) ppm; $^1H\{^{11}B\}$ NMR (400 MHz, $CDCl_3$): δ=7.49-7.40 (m, 2H), 7.39-7.27 (m, 3H), 5.67 (s, 1H), 3.10 (s, 2H), 3.02 (s, 2H), 2.60 (s, 2H), 2.44 (s, 4H), 2.34 (s, 6H), 2.07 (s, 8H), 1.96 (s, 2H), 1.02 (s, 9H) ppm; $^{13}C\{^1H\}$ NMR (101 MHz, $CDCl_3$): δ=146.1, 136.1, 131.2, 128.3, 128.1, 80.6, 76.0, 37.5, 31.0, 26.6 ppm; $^{11}B\{^1H\}$ NMR (128 MHz, $CDCl_3$): δ=70.9 (br. s), 3.4 (s), −0.3 to −15.7 (m) ppm; $^{11}B$ NMR (128 MHz, $CDCl_3$): δ=70.9 (br. s), 3.4 (d, J=137.0 Hz), −0.3 to −15.8 (m) ppm; HRMS (−ESI): calcd 485.5380 for $C_{18}H_{42}B_{21}$ $[M+H]^-$ found 485.5389.

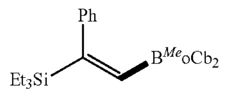

Compound 1o: yellow solid; yield: 90%, 49 mg; $^1H$ NMR (400 MHz, $C_6D_6$): δ=6.96 (br. s, 5H), 6.74 (s, 1H), 3.69-2.03 (m, 20H), 1.56 (s, 6H), 0.86 (t, J=8.0 Hz, 9H), 0.53 (q, J=8.0 Hz, 6H) ppm; $^1H\{^{11}B\}$ NMR (400 MHz, $C_6D_6$): δ=6.96 (br. s, 5H), 6.74 (s, 1H), 3.22 (s, 2H), 3.12-2.76 (m, 10H), 2.71 (s, 2H), 2.58-2.37 (m, 6H), 1.56 (s, 6H), 0.86 (t, J=8.0 Hz, 9H), 0.53 (q, J=8.0 Hz, 6H) ppm; $^{13}C\{^1H\}$ NMR (101 MHz, $C_6D_6$): δ=166.6, 153.2, 145.4, 128.7, 128.5, 127.3, 79.4, 74.6, 25.6, 7.5, 3.5 ppm; $^{11}B$ $\{^1H\}$ NMR (128 MHz, $C_6D_6$): δ=73.3 (br. s), 3.5 (s), 0.1 to −15.2 (m) ppm; $^{11}B$ NMR (128 MHz, $C_6D_6$): δ=73.3 (br. s), 3.4 (d, J=139.5 Hz), −0.6 to −15.6 (m) ppm; HRMS (−ESI): calcd 543.5619 for $C_{20}H_{48}B_{21}Si$ $[M+H]^-$ found 543.5630.

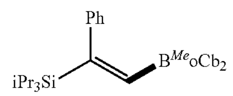

Compound 1p: yellow solid; yield: 85%, 50 mg; $^1H$ NMR (400 MHz, $CDCl_3$): δ=7.34-7.24 (m, 3H), 7.21-7.10 (m, 2H), 6.98 (s, 1H), 3.61-1.51 (m, 26H), 1.33 (sept, J=8.0 Hz, 3H), 1.10 (d, J=8.0 Hz, 18H) ppm; $^1H\{^{11}B\}$ NMR (400 MHz, $CDCl_3$): δ=7.32-7.22 (m, 3H), 7.16-7.11 (m, 2H), 6.95 (s, 1H), 2.92 (s, 4H), 2.54 (s, 2H), 2.47-2.18 (m, 10H), 2.16-1.87 (m, 10H), 1.30 (sept, J=8.0 Hz, 3H), 1.08 (d, J=8.0 Hz, 18H) ppm; $^{13}C\{^1H\}$ NMR (101 MHz, $CDCl_3$): δ=167.5, 154.5, 146.6, 128.6 (two peaks; 128.61, 128.55), 127.8, 79.1, 74.5, 26.0, 18.8, 12.2 ppm; $^{11}B\{^1H\}$ NMR (128 MHz, $CDCl_3$): δ=74.1 (br. s), 2.9 (s), −0.8 to −15.7 (m) ppm; $^{11}B$ NMR (128 MHz, $CDCl_3$): δ=74.1 (br. s), 2.9 (d, J=148.5 Hz), −0.7 to −15.7 (m) ppm; HRMS (−ESI): calcd 584.6010 for $C_{23}H_{53}B_{21}Si$ $[M]^-$ found 584.6025.

Hydroboration of allene with $HB^{Me}oCb_2$. Compound 1r: A benzene (1 mL) solution of phenylallene (11.6 mg, 0.10 mmol) was added to a benzene solution (1 mL) of $HB^{Me}oCb_2$ (32.6 mg, 0.10 mmol) at 23° C. The reaction mixture was stirred for 10 min. After completion of the reaction as monitored by the 1H, and 1H{11B} NMR spectroscopy, the volatiles were removed under vacuum. The pure compound 1r was crystalized from a solution of 1 mL n-pentane at −35° C. Yellow solid; yield: 81%, 36 mg; $^1H$ NMR (400 MHz, $C_6D_6$): δ=7.22-7.17 (m, 2H), 7.15-7.11 (m, 2H), 7.11-7.05 (m, 1H), 6.42 (dt, J=12.0, 4.0 Hz, 1H), 5.28 (dt, J=12.0, 6.0 Hz, 1H), 3.64-1.73 (m, 22H), 1.25 (s, 6H) ppm; $^1H\{^{11}B\}$ NMR (400 MHz, $C_6D_6$): δ=7.23-7.17 (m, 2H), 7.15-7.11 (m, 2H), 7.08 (tt, J=8.0, 4.0 Hz, 1H), 6.43 (d, J=12.0 Hz, 1H), 5.29 (dt, J=12.0, 6.0 Hz, 1H), 3.22 (s, 2H), 2.97-2.90 (m, 6H), 2.72 (s, 2H), 2.66 (s, 4H), 2.36 (s, 4H), 2.31 (s, 4H), 1.26 (s, 6H) ppm; $^{13}C\{^1H\}$ NMR (101 MHz, $C_6D_6$): δ=136.7, 134.2, 128.9, 128.8, 120.2, 80.1, 75.4, 37.9, 25.4 (one aromatic peak merged within the $C_6D_6$ peaks) ppm; $^{11}B\{^1H\}$ NMR (128 MHz, $C_6D_6$): δ=74.1 (br. s), 3.9 (s), −0.9 to −15.1 (m) ppm; $^{11}B$ NMR (128 MHz, $C_6D_6$): δ=74.1 (br. s), 3.8 (d, J=137.0 Hz), −0.9 to −15.1 (m) ppm; HRMS (−ESI): calcd 443.4911 for $C_{15}H_{36}B_{21}$ $[M+H]^-$ found 443.4932.

Hydroboration of phenylallene with $HB^{Me}oCb_2$. Compound 1s: A benzene (1 mL) solution of phenylallene (11.6 mg, 0.10 mmol) was added to a benzene solution (1 mL) of $HB^{Me}oCb_2$ (32.6 mg, 0.10 mmol) at 23° C. The reaction mixture was stirred for 10 min at 70° C. for 12 h. After completion of the reaction as monitored by the $^1H$, and $^1H\{^{11}B\}$ NMR spectroscopy, the volatiles were removed under vacuum. The pure compound 1s was crystalized from a 1 mL dichloromethane solution of the crude reaction mixture at room temperature. Yellow solid; yield: 88%, 39 mg. Compound 1s was also synthesized from compound 1s. When 1r was heated at 70° C. for 12 h it gave 1s in 97% yield. $^1H$ NMR (400 MHz, $CDCl_3$): δ=7.39-7.31 (m, 4H), 7.31-7.27 (m, 1H), 6.71 (d, J=16.0 Hz, 1H), 6.13 (dt, J=16.0, 8.0 Hz, 1H), 3.23-1.88 (m, 28H) ppm; $^1H\{^{11}B\}$ NMR (400 MHz, $CDCl_3$): δ=7.39-7.31 (m, 4H), 7.31-7.25 (m, 1H), 6.71 (d, J=16.0 Hz, 1H), 6.13 (dt, J=16.0, 8.0 Hz, 1H), 3.12 (d, J=8.0 Hz, 2H), 3.01 (s, 4H), 2.65 (s, 2H), 2.51 (s, 4H), 2.36 (s, 4H), 2.31 (s, 4H), 2.16 (s, 2H), 1.98 (s, 6H) ppm; $^{13}C\{^1H\}$ NMR (101 MHz, $CDCl_3$): δ=138.1, 136.9, 129.0, 128.5, 126.3, 118.2, 79.9, 75.0, 42.0, 25.8 ppm; $^{11}B\{^1H\}$ NMR (128 MHz, $CDCl_3$): δ=71.8 (br. s), 3.5 (s), −1.4 to −18.2 (m) ppm; $^{11}B$ NMR (128 MHz, $CDCl_3$): δ=71.8 (br. s), 3.5 (d, J=145.9 Hz), −0.6 to −18.7 (m) ppm.

Hydroboration of internal allenes with $HB^{Me}oCb_2$. A $C_6H_6$ (1 mL) solution of the 1,3-diarylallenes (0.10 mmol) was added to a benzene solution (1 mL) of $HB^{Me}oCb_2$ (32.6 mg, 0.10 mmol) at 23° C. The reaction mixture was stirred for 10 min. After completion of the reaction, the volatiles were removed under vacuum to afford the products.

Hydroboration of cyclopropane with $HB^{Me}oCb_2$. A $C_6D_6$ (1 mL) solution of cyclopropane (0.10 mmol) was added to a $C_6D_6$ solution (1 mL) of 2 (32.6 mg, 0.10 mmol) while stirring at 23° C. After heating the reaction to 40° C. for 12, consumption of the starting materials was verified by $^1H$, and $^1H\{^{11}B\}$ NMR spectroscopy. The volatiles were removed in vacuo and washed with 0.5 mL cold n-pentane and dried in vacuo to give the product.

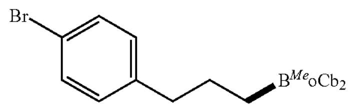

Compound 1v: yellow solid; yield: 90%, 47 mg; $^1H$ NMR (400 MHz, $CDCl_3$): δ=7.47 (d, J=8.0 Hz, 2H), 7.08 (d, J=8.0 Hz, 2H), 2.80-1.92 (m, 30H), 1.86-1.76 (m, 2H) ppm; $^1H\{^{11}B\}$ NMR (400 MHz, $CDCl_3$): δ=7.47 (d, J=8.0 Hz, 2H), 7.08 (d, J=8.0 Hz, 2H), 2.76-2.72 (m, 6H), 2.62 (s, 2H), 2.47 (s, 2H), 2.32 (s, 8H), 2.23 (s, 2H), 2.14 (s, 2H), 2.05 (s, 2H), 1.94 (s, 6H), 1.85-1.76 (m, 1H) ppm; $^{13}C\{^1H\}$ NMR (101 MHz, $CDCl_3$): δ=139.2, 131.9, 130.5, 120.7, 79.5, 38.7, 27.1, 26.0, 9.5 ppm; $^{11}B\{^1H\}$ NMR (128 MHz, $CDCl_3$): δ=5.2 (s), 3.4 (s), −2.9 to −14.3 (m) ppm (central boron peak not observed due to broadening); $^{11}B$ NMR (128 MHz, $CDCl_3$): δ=−8.0 to 0.0 (m), −2.9 to −14.3 (m) ppm (central boron peak not observed due to broadening); HRMS (−ESI): calcd 561.3731 for $C_{15}H_{36}B_{21}BrK$ $[M+K]^-$ found 561.3731.

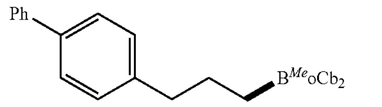

Compound 1w: white solid; yield: 94%, 49 mg; $^1H$ NMR (400 MHz, $C_6D_6$): δ=7.56-7.45 (m, 4H), 7.26-7.20 (m, 2H), 7.15-7.11 (m, 1H), 7.07-7.03 (m, 2H), 3.50-1.76 (m, 22H) 1.72-1.57 (m, 4H), 1.23 (s, 6H) ppm; $^1H\{^{11}B\}$ NMR (400 MHz, $C_6D_6$): δ=7.53-7.47 (m, 4H), 7.26-7.20 (m, 2H), 7.16-7.12 (m, 1H), 7.05 (d, J=8.0 Hz, 2H), 3.25 (s, 2H), 2.98 (s, 4H), 2.74-2.72 (m, 6H), 2.48 (t, J=6.8 Hz, 2H), 2.41 (s, 4H), 2.30 (s, 4H), 1.74-1.57 (m, 4H), 1.25 (s, 6H) ppm; $^{13}C\{^1H\}$ NMR (101 MHz, $C_6D_6$): δ=141.3, 140.5, 139.4, 129.4, 129.2, 127.6, 127.4, 79.8, 75.2, 38.8, 38.5, 27.3, 25.2 ppm; $^{11}B\ \{^1H\}$ NMR (128 MHz, $C_6D_6$): δ=−0.9 (s), −6.1 to −14.2 (m) ppm (central boron peak not observed due to broadening); $^{11}B$ NMR (128 MHz, $C_6D_6$): δ=3.8 (d, J=148.5 Hz), −1.0 to −14.2 (m) ppm (central boron peak not observed due to broadening); HRMS (−ESI): calcd 521.5380 for $C_{21}H_{42}B_{21}$ $[M+H]^-$ found 521.5361.

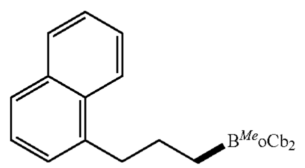

Compound 1x: white solid; yield: 85%, 42 mg; $^1H$ NMR (400 MHz, $CDCl_3$): δ=8.02 (d, J=8.0 Hz, 1H), 7.90 (d, J=8.0 Hz, 1H), 7.79 (d, J=8.0 Hz, 1H), 7.60-7.55 (m, 1H), 7.54-7.49 (m, 1H), 7.46-7.40 (m, 1H), 7.34 (d, J=8.0 Hz, 1H), 3.26 (t, J=8.0 Hz, 2H), 2.88-2.13 (m, 20H), 2.10-2.04 (m, 4H), 2.01-1.95 (m, 4H), 1.89 (s, 6H) ppm; $^1H\{^{11}B\}$ NMR (400 MHz, $CDCl_3$): δ=8.02 (d, J=8.0 Hz, 1H), 7.90 (d, J=8.0 Hz, 1H), 7.79 (d, J=8.0 Hz, 1H), 7.60-7.55 (m, 1H), 7.54-7.49 (m, 1H), 7.46-7.40 (m, 1H), 7.34 (d, J=8.0 Hz, 1H), 3.26 (t, J=8.0 Hz, 2H), 2.71 (s, 2H), 2.59 (s, 2H), 2.43 (s, 4H), 2.28 (s, 4H), 2.21 (s, 4H), 2.13-2.03 (m, 4H), 2.02-1.93 (m, 4H), 1.89 (s, 6H) ppm; $^{13}C\{^1H\}$ NMR (101 MHz, $CDCl_3$): δ=136.4, 134.2, 131.9, 129.2, 127.7, 126.9, 126.4, 126.0, 125.6, 123.4, 79.4, 38.9, 36.6, 26.6, 25.9 ppm; $^{11}B\{^1H\}$ NMR (128 MHz, $CDCl_3$): δ=−0.9 (s), −6.1 to −14.2 (m) ppm; $^{11}B$ NMR (128 MHz, $CDCl_3$): δ=3.82 (d, J=149.2 Hz), −1.0 to −14.2 (m) ppm; HRMS (−ESI): calcd 493.5067 for $C_{19}H_{38}B_{21}$ $[M-H]^-$ found 493.5075.

Oxidation with iodosobenzene. To a stirred $CH_2Cl_2$ solution (5 mL) of 1w (52.1 mg, 0.10 mmol) freshly prepared iodosobenzene (PhIO, 66.0 mg, 0.30 mmol) was added at 23° C. The reaction mixture was then stirred for 12 h at 23° C. After completion of the reaction, as monitored by the $^1H$ NMR spectroscopy, 10 mL 1 (N) HCl was added, and the reaction mixture was further stirred for 1 h. The mixture was then extracted with $CH_2Cl_2$ (3×2 mL). The organic layer was washed with brine solution, dried over $Na_2SO_4$, and the solvent was removed in vacuo. The crude product was then purified by silica gel column chromatography to afford desired product 2a. Compound 2a: $R_f$=0.20 (n-hexanes/ethyl acetate=80/20); pale yellow solid; yield: 75%, 32 mg; $^1H$ NMR (600 MHz, $CDCl_3$): δ=7.61-7.58 (m, 2H), 7.55-7.52 (m, 2H), 7.46-7.42 (m, 2H), 7.36-7.32 (m, 1H), 7.30-7.27 (m, 2H), 3.73 (t, J=6.4 Hz, 2H), 2.76 (dd, J=8.6, 6.8 Hz, 2H), 1.98-1.92 (m, 2H) ppm; $^{13}C\{^{1}H\}$ NMR (151 MHz, $CDCl_3$): δ=141.1, 140.9, 139.1, 129.0, 128.9, 127.3, 127.2, 127.1, 62.5, 34.2, 31.8 ppm.

Deborylative iodination. To a stirred $Et_2O$ solution (2 mL) of 1h (42.8 mg, 0.10 mmol) $I_2$ (25.4 mg, 0.20 mmol) was added, followed by $KO^tBu$ (33.7 mg, 0.30 mmol) at 23° C. The reaction mixture was then stirred for 1 h at 23° C. After completion of the reaction, as monitored by the $^1H$ NMR spectroscopy, the volatiles were removed under vacuum and the crude product was purified by silica gel column chromatography using n-hexanes as eluent to obtain 2b. Compound 2b: $R_f$=0.70 (n-hexanes), pale yellow liquid; yield: 83%, 19 mg; $^1H$ NMR (600 MHz, $CDCl_3$): δ=7.44 (d, J=14.9 Hz, 1H), 7.35-7.27 (m, 5H), 6.83 (d, J=14.9 Hz, 1H) ppm; $^{13}C\{^{1}H\}$ NMR (151 MHz, $CDCl_3$): δ=145.2, 137.8, 128.9, 128.5, 126.1, 76.8 ppm.

What is claimed is:

1. A compound, wherein the compound is bis(1-methyl-ortho-carboranyl)borane ($HB^{Me}oCb_2$) having a structure of:

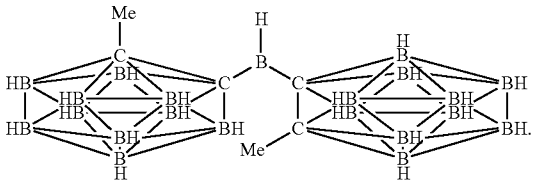

2. The compound of claim 1, for use as a hydroboration reagent.

3. A method of preparing a hydroborated product comprising:

providing a reaction mixture comprising an aliphatic or aromatic compound and a hydroboration reagent, wherein the hydroboration reagent is bis(1-methyl-ortho-carboranyl)borane ($HB^{Me}oCb_2$) and has a structure of:

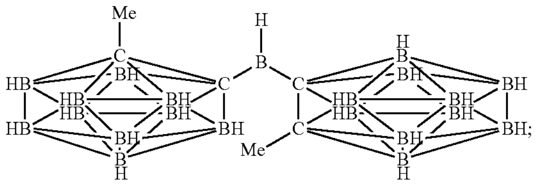

and reacting the aliphatic or aromatic compound with the hydroboration reagent to produce a hydroborated product.

4. The method of claim 3, wherein the aliphatic or aromatic compound is an olefin, alkyne, cyclopropane, or allene.

5. The method of claim 3, wherein the hydroboration reagent is neutral.

6. The method of claim 3, wherein the hydroborated product is a mono-hydroborated alkyne.

7. The method of claim 3, wherein the hydroborated product comprises $B^{Me}oCb_2$ group.

* * * * *